(12) United States Patent
Baphna et al.

(10) Patent No.: US 11,670,185 B2
(45) Date of Patent: Jun. 6, 2023

(54) ADAPTIVE MACHINE LEARNING SYSTEM

(71) Applicant: Analyttica Datalab Inc., Wilmington, DE (US)

(72) Inventors: Rajiv Baphna, Bangalore (IN); Satyamoy Chatterjee, Bangalore (IN); Halasya Siva Subramania, Bangalore (IN); Ashutosh Joshi, Bangalore (IN)

(73) Assignee: Analyttica Datalab Inc., Wilmington, DE (US)

( * ) Notice: Subject to any disclaimer, the term of this patent is extended or adjusted under 35 U.S.C. 154(b) by 0 days.

(21) Appl. No.: 17/070,715

(22) Filed: Oct. 14, 2020

(65) Prior Publication Data

US 2021/0027647 A1 Jan. 28, 2021

Related U.S. Application Data

(63) Continuation of application No. 15/912,333, filed on Mar. 5, 2018, now abandoned, which is a continuation-in-part of application No. 15/888,799, filed on Feb. 5, 2018, now abandoned, which is a
(Continued)

(30) Foreign Application Priority Data

Sep. 5, 2013 (IN) .......................... 3975/CHE/2013

(51) Int. Cl.
*G09B 7/00* (2006.01)
*G09B 5/00* (2006.01)
*G09B 5/08* (2006.01)
*G09B 7/04* (2006.01)

(52) U.S. Cl.
CPC ................. *G09B 7/00* (2013.01); *G09B 5/00* (2013.01); *G09B 5/08* (2013.01); *G09B 7/04* (2013.01)

(58) Field of Classification Search
CPC ............... G09B 5/00; G09B 7/00; G09B 7/04
See application file for complete search history.

(56) References Cited

U.S. PATENT DOCUMENTS

| | | | |
|---|---|---|---|
| 7,280,991 B1 * | 10/2007 | Beams | G09B 5/14 706/46 |
| 2002/0168621 A1 | 11/2002 | Cook | |

(Continued)

*Primary Examiner* — Robert J Utama
(74) *Attorney, Agent, or Firm* — Perry S. Clegg; Johnson & Martin, P.A.

(57) ABSTRACT

Apparatuses, systems, methods, and computer program products are disclosed for adaptive machine learning. An apparatus includes a monitoring module that continuously monitors one or more interactions of a user while the user performs one or more simulated tasks digitally presented to the user that are associated with a learning path. The apparatus includes a metadata module that tracks data describing the user's interactions during the user's performance of one or more simulated tasks. The apparatus includes a machine learning module that, dynamically and in real-time, optimizes the user's learning path by simulating multiple different learning paths using one or more machine learning processes and tracked data. The apparatus includes a recommendation module that presents one or more recommendations to the user for optimizing the user's learning path. One or more recommendations may be generated as a function of the optimized learning path.

19 Claims, 21 Drawing Sheets

Related U.S. Application Data continuation of application No. 14/477,843, filed on Sep. 4, 2014, now Pat. No. 9,886,867.

(56)  References Cited

U.S. PATENT DOCUMENTS

| | | | |
|---|---|---|---|
| 2005/0053908 A1* | 3/2005 | Satheesh | G09B 5/06 434/350 |
| 2006/0078856 A1* | 4/2006 | Kellman | G09B 7/00 434/118 |
| 2009/0142742 A1 | 6/2009 | Goldberg | |
| 2010/0331064 A1 | 12/2010 | Michelstein | |
| 2013/0122980 A1* | 5/2013 | Lachina | G09B 5/00 463/9 |
| 2013/0311409 A1* | 11/2013 | Ye | G06N 20/00 706/12 |
| 2014/0120516 A1* | 5/2014 | Chiang | G09B 5/02 434/362 |
| 2014/0122595 A1* | 5/2014 | Murdoch | C03C 21/002 709/204 |
| 2014/0205990 A1* | 7/2014 | Wellman | G09B 7/00 434/362 |
| 2015/0243179 A1* | 8/2015 | Zaslavsky | G06F 3/04842 434/327 |

* cited by examiner

FIG. 5

| FILTER BY DOMAIN | CHALLENGES | LEADERBOARD | <USER NAME> |

| LEADERBOARD | | CUMULATIVE ▽ | 804 |

DOMAIN [FSI]     SORT BY CUMULATIVE, CHALLENGE

| RANK | USER | SCORE | DOMAIN |
|---|---|---|---|
| 1 | JOHN | 422 | FSI |
| 2 | PAUL | 405 | FSI |
| 3 | ROBERT | 398 | FSI |
| 10 | JIM | 277 | FSI |
| 44 | PETER (YOU) | 112 | FSI |

◀◀ ◀ 1 2 3 4 5 6 7 8 9 10 ▶ ▶▶

10 PER PAGE    GO BACK

ADAPTIVE MACHINE LEARNING SYSTEM

CROSS-REFERENCES TO RELATED APPLICATIONS

This application is a continuation of and claims priority to U.S. patent application Ser. No. 15/912,333 entitled ADAPTIVE MACHINE LEARNING SYSTEM and filed on Mar. 5, 2018, for Rajiv Baphna et al. which is a continuation-in-part application of and claims priority to U.S. patent application Ser. No. 15/888,799 entitled "SIMULATION-BASED LEARNING SYSTEM AND METHOD FOR TRAINING AND SCORING ONE OR MORE CHALLENGES TAKEN BY A USER" and filed on Feb. 5, 2018, for Rajiv Baphna et al., which is a continuation of and claims priority to U.S. patent application Ser. No. 14/477,843 entitled "SIMULATION-BASED LEARNING SYSTEM AND METHOD FOR TRAINING AND SCORING ONE OR MORE CHALLENGES TAKEN BY A USER" and filed on Sep. 4, 2014, for Rajiv Baphna et al., which is incorporated herein by reference, which claims priority to Indian patent application no. 3975/CHE/2013 filed on Sep. 5, 2013, the complete disclosure of which, in its entirely, is herein incorporated by reference.

FIELD

The embodiments herein generally relate to an adaptive machine learning system for analytics training, and more particularly to a machine learning system for processing and analyzing behavioral and factual data, and progress of a user.

BACKGROUND

Training in analytics and other fields is currently focused on showing trainees the tools, e.g., showing the underlying statistical packages/products/codes for analytics training, and their applications. The current mode of is primarily unilateral through online learning, video sessions, class room teaching, or personal training, along with some laboratory work for hands on experience. Additionally, the current model of online and in-person education is non-scalable and can be limited by the availability of the right talent to teach. The online education model relies on a 'one size fits all' approach, which does not customize learning to individual needs or effectively address diversity of talent. Thus, there is a need for an intelligent, virtual and scalable training system and platform with experience-based learning catered to individual needs that allows a user to experience real-life scenarios in an application-based rather than a theory-based environment with better interactive learning in real-time and in a collaborative manner.

SUMMARY

Apparatuses, systems, methods, and computer program products are disclosed for adaptive machine learning. In one embodiment, an apparatus includes a monitoring module that continuously monitors one or more interactions of a user while the user performs one or more simulated tasks digitally presented to the user that are associated with a learning path. The apparatus, in further embodiments, includes a metadata module that tracks data describing the user's interactions during the user's performance of one or more simulated tasks. The apparatus, in some embodiments, includes a machine learning module that, dynamically and in real-time, optimizes the user's learning path by simulating multiple different learning paths using one or more machine learning processes and tracked data. In certain embodiments, the apparatus includes a recommendation module that presents one or more recommendations to the user for optimizing the user's learning path. One or more recommendations may be generated as a function of the optimized learning path. In one embodiment, at least a portion of the modules include one or more of hardware circuits, programmable hardware devices, and executable code, which is stored on one or more computer readable storage media.

In one embodiment, the machine learning module further comprises an artificial neural network configured to use the tracked data to determine an optimal learning path for the user. In some embodiments, the artificial neural network is trained using a plurality of historical data that is tracked for interactions from a plurality of different users that performed simulated tasks associated with their respective learning paths.

In further embodiments, the machine learning module uses output from the artificial neural network to generate the one or more recommendations. In certain embodiments, the machine learning module compares the tracked data from the user's interactions with one or more reference learning paths for the one or more simulated tasks to determine one or more recommendations for optimizing the user's learning path.

In one embodiment, the one or more reference learning paths include one or more of an expert learning path, a learning path for a peer of the user, and/or previous versions of the user's learning path. In various embodiments, the machine learning module further incorporates user profile data to optimize the user's learning path. The user profile data may include demographic data, experience data, academic data, and the user's learning schedule.

In some embodiments, the apparatus includes a code integrating module that converts the user's interactions for performing the one or more simulated tasks into code for one or more programming languages. In certain embodiments, the one or more recommendations comprise one or more of suggestions, hints, instructions, and advice for performing the one or more simulated tasks by one or more of using less time and using a lesser number of steps.

In one embodiment, the one or more interactions that the monitoring module monitors comprises one or more of cursor movements, keyboard input, eye movements, and voice input. In further embodiments, the monitoring module creates metadata for each of the one or more interactions. The metadata for each interaction may include an identifier for the interaction, a type of the interaction, a timestamp for when the interaction occurred, a location for the interaction, and an amount of time that the interaction was performed.

In various embodiments, the data that the data tracking module tracks for the one or more interactions includes one or more of interface elements that the user selects, interface elements that the user clicks on, areas of the display that the user looks at, content that the user reads, content that the user writes, an amount of time that the user consumes a multimedia element, website navigation, content consumption patterns.

In one embodiment, the apparatus includes a gaming module that assigns the user scores during the user's performance of the one or more simulated tasks and compares, in real-time, the user's scores during the user's performance of the one or more simulated tasks with scores for other users who are performing the same simulated tasks. In further embodiments, the apparatus includes a collaborating module that facilitates communications between the user and one or more other users who are performing the same simulated tasks. In some embodiments, the one or more simulated tasks comprise one or more tasks associated with a data analysis project.

A system, in one embodiment, includes a network, a server configured to present a learning interface to a user, and a neural network communicatively coupled to the server over the network. In one embodiment, the system includes a monitoring module that continuously monitors one or more interactions of a user while the user performs one or more simulated tasks digitally presented to the user that are associated with a learning path. The system, in further embodiments, includes a metadata module that tracks data describing the user's interactions during the user's performance of one or more simulated tasks. The system, in some embodiments, includes a machine learning module that, dynamically and in real-time, optimizes the user's learning path by simulating multiple different learning paths using one or more machine learning processes and tracked data. In certain embodiments, the system includes a recommendation module that presents one or more recommendations to the user for optimizing the user's learning path. One or more recommendations may be generated as a function of the optimized learning path.

In one embodiment, the system includes one or more data stores for storing the tracked data, the one or more data stores located remotely to the server and communicatively coupled to the server over the network. In some embodiments, the server is one of a plurality of virtual servers executing on cloud devices. The plurality of virtual servers may be configured to execute different machine learning processes for optimizing the user's learning path. The one or more data stores may be mounted as local drives on the virtual servers.

An apparatus, in one embodiment, includes means for continuously monitoring one or more interactions of a user while the user performs one or more simulated tasks digitally presented to the user. The one or more simulated tasks may be associated with a learning path. The apparatus, in further embodiments, includes means for tracking data describing the user's interactions during the user's performance of one or more simulated tasks. The apparatus, in some embodiments, includes means for, dynamically and in real-time, optimizing the user's learning path by simulating multiple different learning paths using one or more machine learning processes and tracked data. In certain embodiments, the apparatus includes means for presenting one or more recommendations to the user for optimizing the user's learning path. One or more recommendations may be generated as a function of the optimized learning path.

A computer program product, in one embodiment, includes a computer readable storage medium, that is not a transitory signal, having program code embodied therein. The program code, in some embodiments, is readable/executable by a processor for continuously monitoring one or more interactions of a user while the user performs one or more simulated tasks digitally presented to the user. The one or more simulated tasks may be associated with a learning path. The program code, in further embodiments, is readable/executable by a processor tracking data describing the user's interactions during the user's performance of one or more simulated tasks. The program code, in some embodiments, is readable/executable by a processor for, dynamically and in real-time, optimizing the user's learning path by simulating multiple different learning paths using one or more machine learning processes and tracked data. The program code, in certain embodiments, is readable/executable by a processor for presenting one or more recommendations to the user for optimizing the user's learning path. One or more recommendations may be generated as a function of the optimized learning path.

Reference throughout this specification, including the summary, to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

The embodiments herein will be better understood from the following detailed description with reference to the drawings, in which:

FIG. 5 illustrates a user interface view of receiving one or more hints while solving the at least one challenge according to an embodiment herein;

FIG. 8 illustrates a user interface view of a consolidated rank sheet of the user specific to one or more challenges according to an embodiment herein;

DETAILED DESCRIPTION

Figure 1:
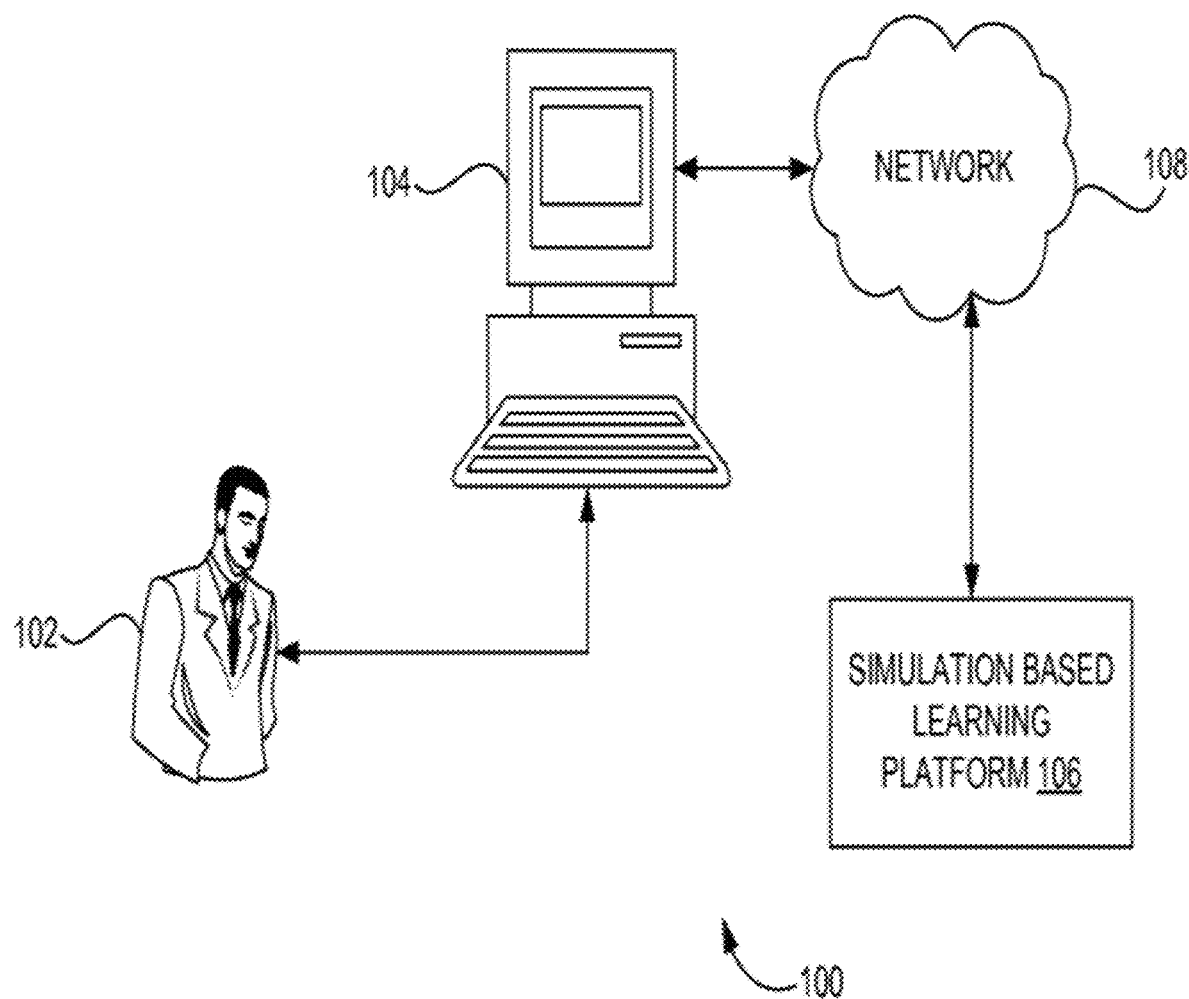
FIG. 1 illustrates a system view of a user interacting with an simulation-based learning platform through a computing device for data oriented learning according to an embodiment herein.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "platform," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As mentioned, there remains a need for platform with experience-based learning to individual needs which allows a user to experience real-life scenarios and explore the options and analyze data with better interactive learning in real-time, and which will lead the user on a customized, optimal path for the user to converge on learning and applying skills better and faster, and in addition allow a user to retain that learning for a much longer time. The embodiments herein achieve this by providing a machine learning based interactive-learning platform for data-oriented learning with focuses on one or more application of concepts based on simulation of real business scenarios also by providing scenarios with appropriate data sets and interfaces to tools. A simulation-based learning platform provides a simulation-based learning system and method for scoring one or more challenges taken by a user and trains the user. An adaptive machine learning system processes and analyzes behavioral data and progress of a platform user and collaborates with individual users based on the individual user needs. Referring now to the drawings, and more particularly to FIGS. 1 through 14, where similar reference characters denote corresponding features consistently throughout the figures, there are shown preferred embodiments.

FIG. 1 illustrates a system view of a user 102 interacting with a simulation-based learning platform 106 through the computing device 104 for data-oriented and/or adaptive learning according to embodiments herein. The system 100 includes the user 102, a computing device 104, a simulation-based learning platform 106, and a network 108. The user 102 interacts with the simulation-based learning platform 106 through the computing device 104 for interactive-learning or data oriented learning (e.g., analytics, science) that focuses applications of concepts based on simulation. In one embodiment, the simulation-based learning platform 106 is a web-based interactive-learning platform for analytics, or other subjects, which incorporates elements of games such as simulation and gamification along with machine-learning, collaboration, and intelligent scoring. In one embodiment, the simulation-based learning platform 106 breaks learning up into concepts and/or applications that are unique to a user.

In one embodiment, the system renders a user action into corresponding code required by the platform. For example, if a selected statistical programming package is 'R', the simulation-based learning platform 106 may generate code in R based on the user's actions during the simulations. In one embodiment, the simulation-based learning platform 106 converts various user actions (e.g., a user click) to various programming or computing instructions (e.g., R, SAS, Python, Julia, Java, C, and/or the like) with scores and assessments (e.g., areas of improvement) for experiential learning on analytics. In one embodiment, learning may be segmented into at least two phases (e.g., concept and execution) using the appropriate package. In one embodiment, the simulation-based learning platform 106 is implemented in the computing device 104.

In one embodiment, the simulation-based learning platform 106 is configured to continuously monitor a user's interactions as the user 102 performs various simulated tasks that are digitally presented to the user on a computing device 104, track and record/store data over time, describing the user's interactions, optimize the user's learning path using machine learning processes on the tracked data, and present machine-learning generated recommendations to the user 102 for optimizing the user's learning path. The user learning paths may be continuously analyzed using machine learning, and leveraged across multiple users 102 to help the users 102 learn faster, better, and with higher retention rates.

The simulation-based learning platform 106, in certain embodiments, provides an improvement over traditional learning platforms by providing a dynamic, situation-based learning platform that fosters a learn-by-doing and a do-by-learning approach with real data to learn and apply skills in various subject matters such as analytics. For example, the simulation-based learning platform 106 may assist the user 102 in understanding the business and financial impact of applying analytics to real-world problems, in real-time, and also test the analyses under various stress conditions and scenarios, in an intelligently guided manner, thereby enhancing the way the user 102 learns to apply their knowledge in real-life scenarios very quickly and efficiently. The simulation-based learning platform 106 generates recommendations using machine learning algorithms and processes that are contextual and timely, according to the user's needs along defined learning paths. As used herein, a learning path may be a dynamically determined and user-tailored course of action to improve the user's ability to learn and apply skills for a particular subject matter. A learning path may be generally known as a solution path.

A solution path, as used herein, may be a learning path (e.g., for a user 102 who is learning the selected subject matter) or a reference path (e.g., a solution path based on an expert's or other user's solution path for completing challenges/simulated tasks associated with the selected subject matter), and a new optimized solution path, which is a solution path providing a more accurate answer in less time or less steps. The optimized solution paths (e.g., the solution paths that are improved over time using machine learning, as described below) may be determined using machine learning to evaluate solution paths taken by numerous users and experts and determining which solution paths are best, e.g., in terms of time and/or number of steps. Thus, the optimized solution path may include feedback/data from both user's studying the subject matter, e.g., the learning path, and experts, e.g., the reference path.

The simulation-based learning platform 106 uses machine learning techniques/processes/algorithms to improve the functionality of computer systems by allowing the computer systems to continuously mature and learn over time in discovering the optimal and/or recommended learning path for a particular user 102 and/or a reference path for an expert or other user. As more and more users 102 interact with the simulation-based learning platform 106, a repository of data that describes user behaviors, interactions, patterns, and/or the like may be gathered by continuously monitoring the users' interactions and usage patterns/behaviors over time to continuously improve the accuracy and applicability of learning pattern recommendations for particular users 102.

In another embodiment, the simulation-based learning platform 106 is implemented in a computing device 104 such as a desktop computer, a laptop computer, a smart speaker (e.g., Amazon Echo®, Google Home®, Apple HomePod®), a security system, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera. Other devices may include a display device, e.g., a television; a set-top box, e.g., a streaming device such as an Apple TV®, Amazon Fire®, Roku® player, and/or the like, a gaming console such as an Xbox®, a PlayStation®, and/or the like, a cable or satellite receiver, a surround sound receiver, and/or the like; a smart phone or tablet device, a camera, and/or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium. The computing device 104 may be a local or remote device, e.g., a server accessible via the cloud/internet, and may be configured as a webserver and/or may be configured to present web pages to a user 102 that are received from a webserver over the network 108.

In some embodiments, the computing device 104 may be communicatively coupled to various virtual servers that execute on cloud devices that are accessible over the internet or other network 108. In such an embodiment, the virtual servers may be configured to execute one or more machine learning processes for optimizing a user's learning path. In other words, the virtual servers may implement one or more features of a neural network used to perform machine learning processes, as described in more detail below. In such an embodiment, one or more data stores, e.g., databases, may be mounted as local drives on the virtual servers to facilitate efficient data transfers between the virtual servers and the data stores.

In one embodiment, the simulation-based learning platform 106 communicates with the computing device 104 through the network 108. The network 108 may include a wireless network, such as a wireless cellular network, a local wireless network, such as a Wi-Fi network, a Bluetooth® network, a near-field communication ("NFC") network, an ad hoc network, and/or the like. The network 108 may include a wide area network ("WAN"), a storage area network ("SAN"), a local area network ("LAN"), an optical fiber network, the internet, or other digital communication network. The network 108 may include two or more networks. The network 108 may include one or more servers, routers, switches, and/or other networking equipment. The network 108 may also include one or more computer readable storage media, such as a hard disk drive, an optical drive, non-volatile memory, RAM, or the like.

Figure 2A:
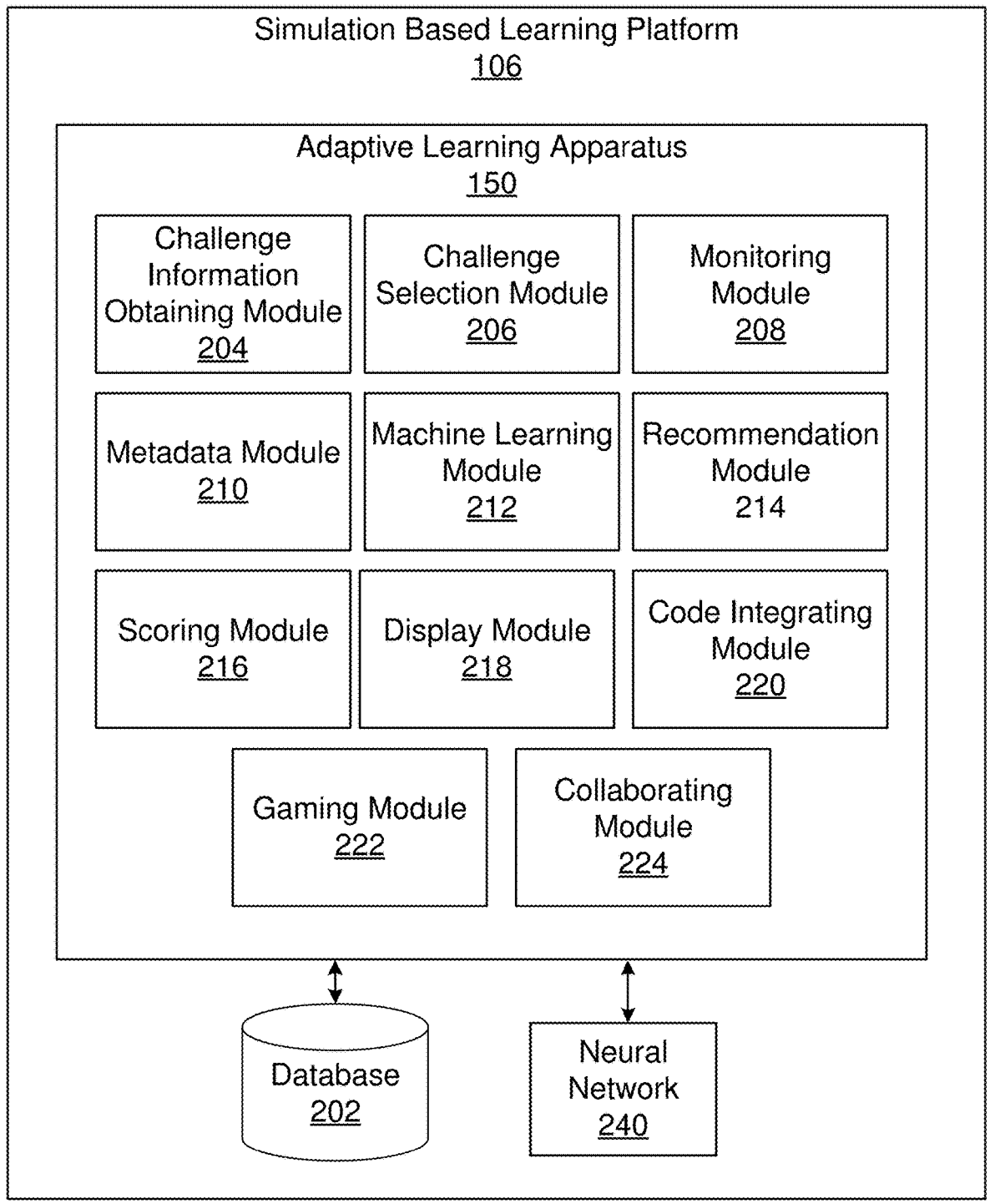
FIG. 2A illustrates a schematic block diagram of a simulation-based learning platform.

FIG. 2A illustrates a view of the simulation-based learning platform 106 according to embodiments herein. In one embodiment, the simulation-based learning platform 106 includes an embodiment of an adaptive learning apparatus 150. The adaptive learning apparatus 150, in one embodiment, includes one or more of a challenge information obtaining module 204, a challenge selection module 206, a monitoring module 208, a metadata module 210, a machine learning module 212, a recommendation module 214, a scoring module 216, a display module 218, a code integrating module 220, a gaming module 222, and a collaborating module 224, which are described in more detail below.

In one embodiment, the simulation-based learning platform 106 is communicatively connected to a database 202, e.g., over a network 108. The database 202, in one embodiment, is configured to store user information, e.g., demographic information for the user 102, information corresponding to the user's 102 interactions related to courses, cases, projects, and challenges presented to the user 102, and/or the like. In one embodiment, the database 202 may reside in remote server such as a cloud server. The database 202 may be embodied as a relational database, a NoSQL database, a key-value database, a distributed database, a cloud database, and/or the like.

Figure 15:
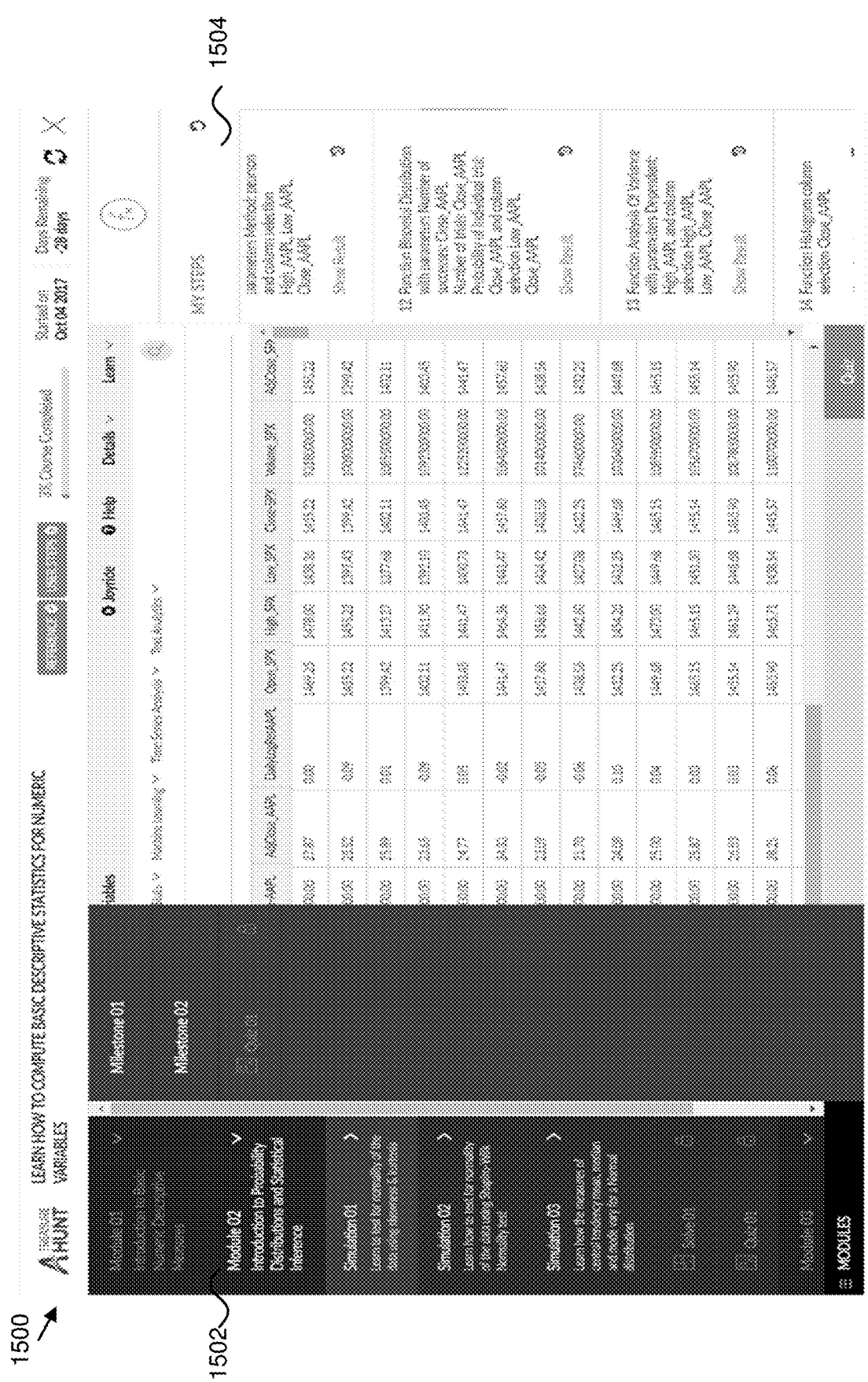
FIG. 15 illustrates a user interface for selecting a course task to complete.

The challenge information obtaining module 204 obtains information associated with a plurality of challenges or simulated tasks. As used herein, the challenges or simulated tasks include instructions, activities, and/or the like that are part of a course, project, class, simulation, and/or the like for learning one or more skills for a subject area such as analytics. The plurality of challenges/simulated tasks may be digitally presented to a user 102 on a computer, e.g., as a desktop application, a web application, a mobile application, and/or the like, to provide the user 102 with a simulated problem/challenge to accomplish that may reflect a real-life problem/challenge that the user 102 may face if working in the industry for the selected course. The plurality of challenges/simulated tasks may be obtained from the database 202. The challenges/simulated tasks may be part of a learning path for the user 102 for the particular course or subject that the user 102 is learning. As described above, a user's learning path may be based on a training course that the user 102 selects, and a selection of challenges/simulated tasks within the training course, as depicted in FIG. 15.

Figure 16:
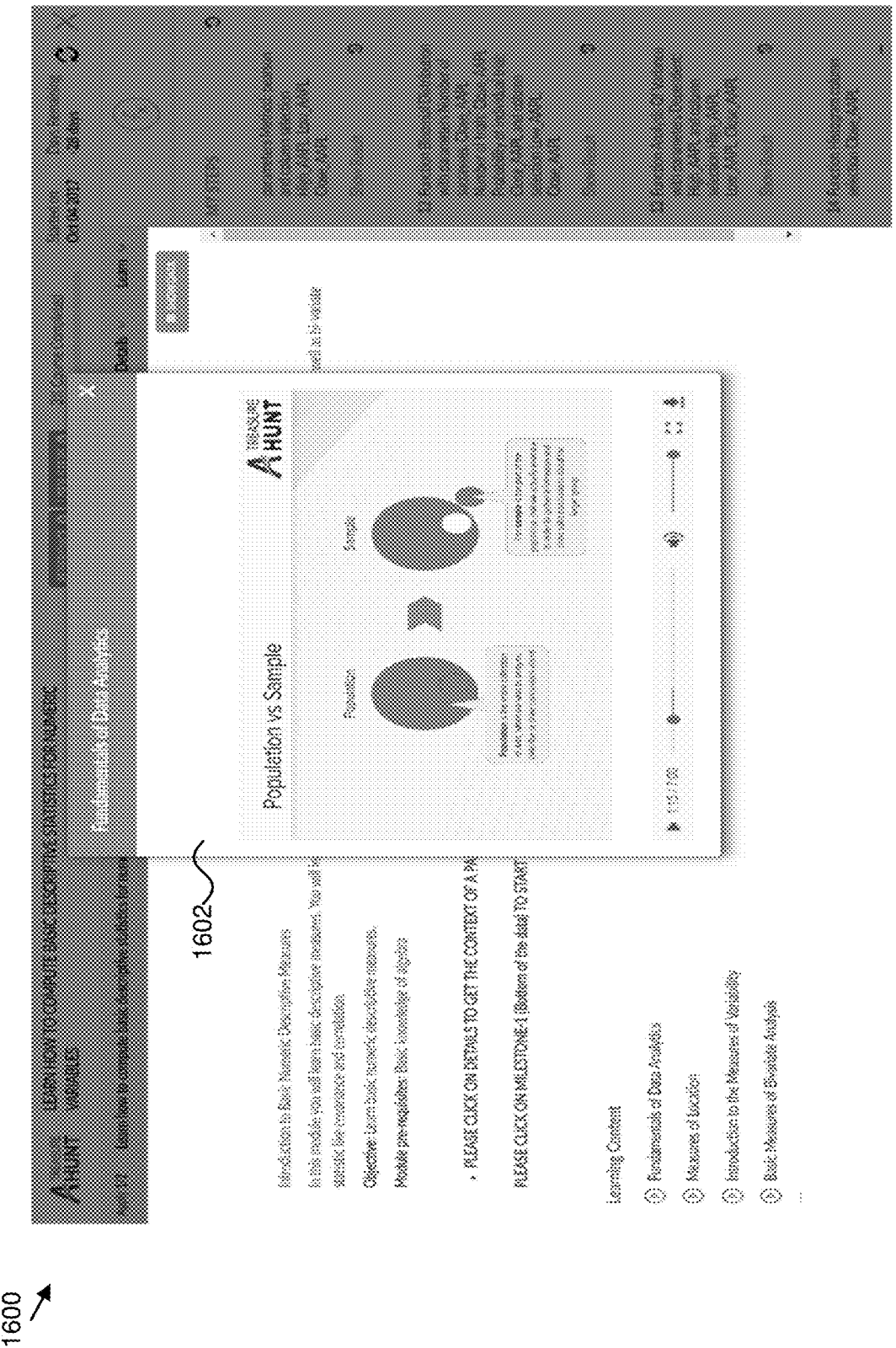
FIG. 16 illustrates a user interface for a presenting course information.
Figure 17:
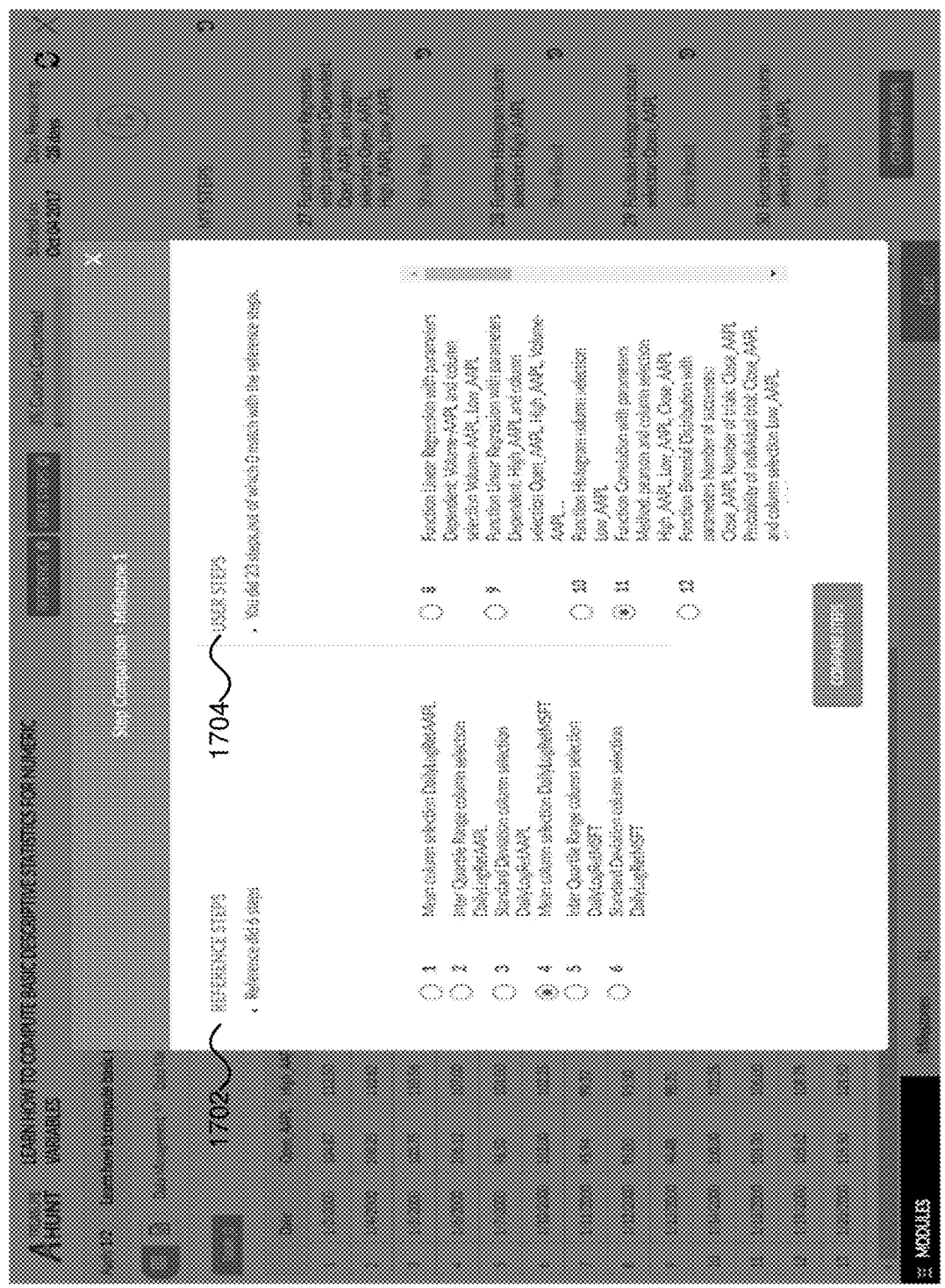
FIG. 17 illustrates a user interface for comparing a user's learning path with a reference learning path.

For instance, a learning path for a course may include audio-video content, challenges/simulated tasks for the user 102 to perform, simulations involving live data, PDF files, PowerPoint® files, quizzes/tests, open-book data-based problems, real-life case studies, problems to solve, instructional/explanatory/study materials (as depicted in FIG. 16), and/or the like. Each course available for a user has a learning path, e.g., a road map from basic to expert difficulty levels, which can be used to measure the learning curve for a specific or a type of user 102. The user 102 may then be assigned to one or more different categories based on various parameters. For each user a learning format may be determined that is most effective for the user 102. For instance, the learning format may include more hands-on tasks instead of quizzes or tests based on the most effective way for the user 102 to learn, as determined by the machine learning module 222 described below. In certain embodiments, an expert or other user, or a set of users, may complete the same set of challenges/simulated tasks as the user 102 in order to create a reference path, which may be compared to the user's learning path to determine how the user 102 compares to the expert/set of other users, in terms of completing challenges/simulated tasks (as depicted in FIG. 17).

Figure 3:
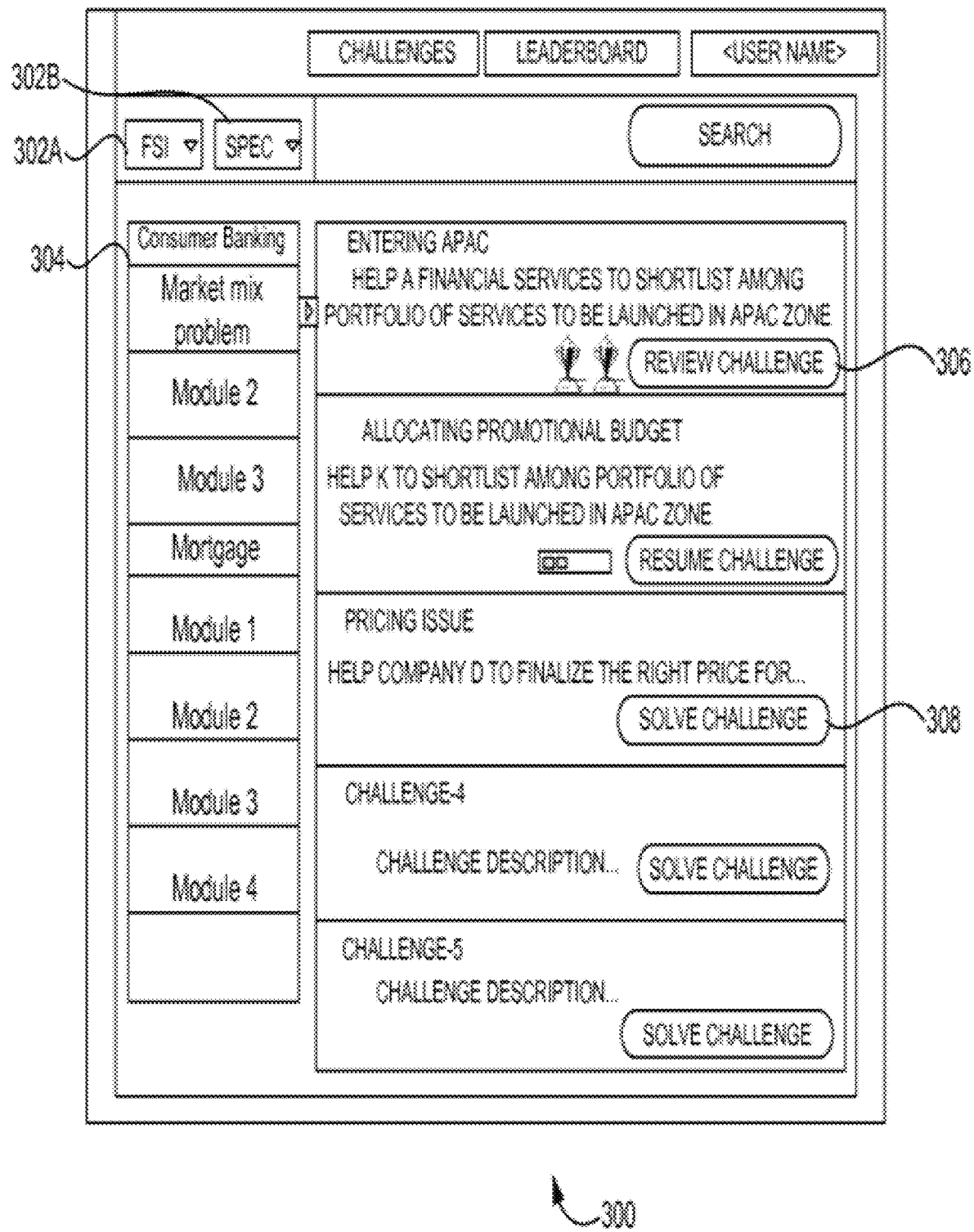
FIG. 3 illustrates an user interface view of interaction with an simulation-based learning platform through a computing device for data oriented learning according to an embodiment herein.

The challenge selection module 206 processes a selection of at least one challenge/simulated task from the plurality of challenges/simulated tasks with at least one or more actions or one or more steps performed by the user 102. For instance, the challenge selection module 206 may present a plurality of available challenges/simulated tasks to the user 102, as shown in FIG. 3, that the user may choose from to learn how to accomplish the selected challenge/simulated task. The list of available challenges/simulated tasks may be derived or provided as part of the course that the user 102 selects to study. For instance, if the user selects an analytics course to learn how to perform various data analytics and modeling, the challenge selection module 206 may present a list of predefined, predetermined, pre-created, and/or the like challenges/simulated tasks for the analytics course.

The monitoring module 208, in one embodiment, is configured to continuously monitor one or more interactions of a user while the user performs one or more simulated tasks that are digitally presented to the user 102, and which are associated with a learning path for the user 102 based on the course that is selected. In one embodiment, the monitoring module 208 is configured to record one or more interactions and/or steps taken by the user 102 to solve a challenge/simulated task. Similarly, the monitoring module 208 may be used to monitor one or more interactions of an expert or other user while the expert or other user performs the one or more simulated tasks that are digitally presented to the user 102, and which become associated with a reference path for the expert or other user.

In one embodiment, the monitoring module 208 includes built-in intelligence to identify and distinguish between steps/interactions that are exploratory and steps/interactions that modify the data. For instance, exploratory interactions may include the user 102 moving the cursor around the interface for a period of time before clicking or interacting with a graphical element presented on the interface. Data altering steps/interactions, on the other hand, may include interactions that the user 102 takes as part of a challenge/simulated task such as updating data in a spreadsheet.

In one embodiment, one or more steps/interactions taken by the user 102 that are recorded may be displayed with a link, e.g., a hyperlink that allows the user 102 to replay a step/interaction or reverse one or more steps/interactions. For example, if the user 102 takes a number of steps towards completing a simulated task, but does not like the previous three steps that he/she took to complete the task, then the user 102 may click on a link to under or go back to a point prior to when the previous three steps were taken. In one embodiment, the monitoring module 208 may highlight one or more steps/interactions with one more colors, icons, text formatting, and/or the like to specify a status of the one or more steps/interactions, e.g., a step rating indicating whether the step was a good decision at that point of the task, and/or progress of a particular simulated task e.g., a percentage of the task that the user 102 has completed. In one embodiment, the monitoring module 208 interacts with the scoring module 214, described below, to compute a deviance of the user's 102 learning path and the steps/interactions that the user 102 has taken as compared to an expert's, or other set of users', reference path.

The monitoring module 208, in one embodiment, "plays" a series of pre-recorded steps/interactions for a particular challenge/simulated task. For example, the monitoring module 208 may replay each step/interaction taken by an expert or other users while solving a challenge/simulated task that the user 102 is currently working on. In a further embodiment, a user 102 can walk through the recorded series of steps/interactions by an expert or other user for completing a challenge/simulated task to learn step-by-step how to correctly complete the challenge/simulated task and/or to check their progress against other users 102. In one embodiment, the playback option may be used as a mode of learning in which a user selects challenges/simulated tasks from a repository and replays how various other users have solved the challenge/simulated task, or the user's 102 own solution paths created for challenges solved by the user 102 in the past. In one embodiment, the monitoring module 208 includes an instance of a steps recording module.

In one embodiment, the metadata module 208 is configured to create metadata for each of the steps/interactions that the user 102 performs during use of the simulation-based learning platform 106. The metadata, for instance, may include information describing the step/interaction that the user 102 performed. For example, the metadata may include an identifier for the interaction, e.g., a unique identifier, a type of the interaction, e.g., a mouse click, a mouse scroll, a keyboard input, a voice input, an eye movement, a camera input, other sensor inputs, and/or the like, a timestamp for when the interaction occurred, a location for the interaction, e.g., a relative or absolute location on a display, an amount of time that the interaction was performed, e.g., the duration of the interaction, and/or the like.

In one embodiment, the metadata module 210 is configured to track data by collecting, storing, interpreting, manipulating, converting, and/or the like data that is associated with the steps/interactions that the user 102 takes to complete a challenge/simulated task in real-time when the step/interaction occurs. For example, the metadata module 210 may receive a signal indicating when a user moves a mouse, clicks a button, presses a key, and/or the like. Accordingly, in response to the input event, the metadata module 208 may track the data associated with the event.

For instance, some of the data that the metadata module 210 may track includes interface elements that the user selects, interface elements that the user clicks on, areas of the display that the user looks at, content that the user reads, content that the user writes, an amount of time that the user consumes a multimedia element, website navigation actions, content consumption patterns (e.g., how long a user 102 watches a video before stopping it, which videos users watch; free flow, random, or structured way in which the content is consumed, etc.), any kind of sensor data inputs like from a camera, course navigation, quiz/test results, responses to survey questions, response to games/achievements, experimentation with available data and learning behavior, code navigation patterns (e.g., code navigation patterns with statistical programs such as R, SAS, Python, Julia, Matlab, etc.), collaboration patterns, and/or the like.

In certain embodiments, the metadata module 210 also stores static data associated with a user 102, e.g., user profile data such as demographic data (e.g., age, gender, education, etc.), experience data (e.g., education, work experience, certifications, etc.), the user's 102 learning schedule (e.g., when the user 102 is available to learn), the user's geographic location, the user's learning conditions (e.g., the user's intention for learning, the user's time and duration for learning, and/or the like), the user's current knowledge of the subject matter, and/or the like.

In one embodiment, the metadata module 210 presents one or more quizzes, polls, surveys, tests (e.g., psychometric tests), and/or the like to the user 102 and collects the user's response as user data. Furthermore, the metadata module 210 may receive subjective data from the user such as user feedback, comments, notes, and/or the like in regards to a challenge/simulated task, a course, a case, the interface, and/or any and all aspects of the simulation-based learning platform 106. In various embodiments, the metadata module 210 tracks the user's messages, notes, comments, etc., while collaborating with other users during the user's progress through a challenge/simulated task. In such an embodiment, the metadata module 210 may work in conjunction with the collaborating module 224, described in more detail below.

The metadata module 210, in certain embodiments, stores the data in a database in such a way that the data can be retrieved/accessed in an efficient manner. For instance, the metadata module 210 may store the data at an atomic level, the primary key at a user level, and the secondary keys at an application level across tables in a relational/time series database.

In one embodiment, the machine learning module 212 is configured to dynamically and in real-time optimize the user's learning path and/or the expert's/other user's reference path by simulating multiple different learning paths for the user 102 and/or reference paths for the expert/other user by processing the tracked data, e.g., the metadata, through one or more machine learning algorithms. As used herein, machine learning may refer to the process of a computer learning over time without being explicitly programmed. The machine learning module 212 may apply various machine learning algorithms, techniques, methods, and/or the like to the tracked and static data in the database 202 to build models for optimizing the user's learning path and/or the expert's/other user's reference path for the selected course/subject matter.

In machine learning, in one embodiment, techniques may be broadly classified as supervised learning and unsupervised learning. In supervised learning, the objective function is clearly defined. The objective function is the function that the machine learning algorithms are attempting to optimize using the provided inputs and weights and/or other factors calculated using historical data. In certain embodiments, different factors may have different levels of impact on the results. For instance, a single factor alone may not be significant, but when two or more factors are observed in conjunction, they may have significant impact on results. In unsupervised learning, on the other hand, the objective functions is not predefined, and the historical data is available in such a way that the outcome is created.

Figure 2B:
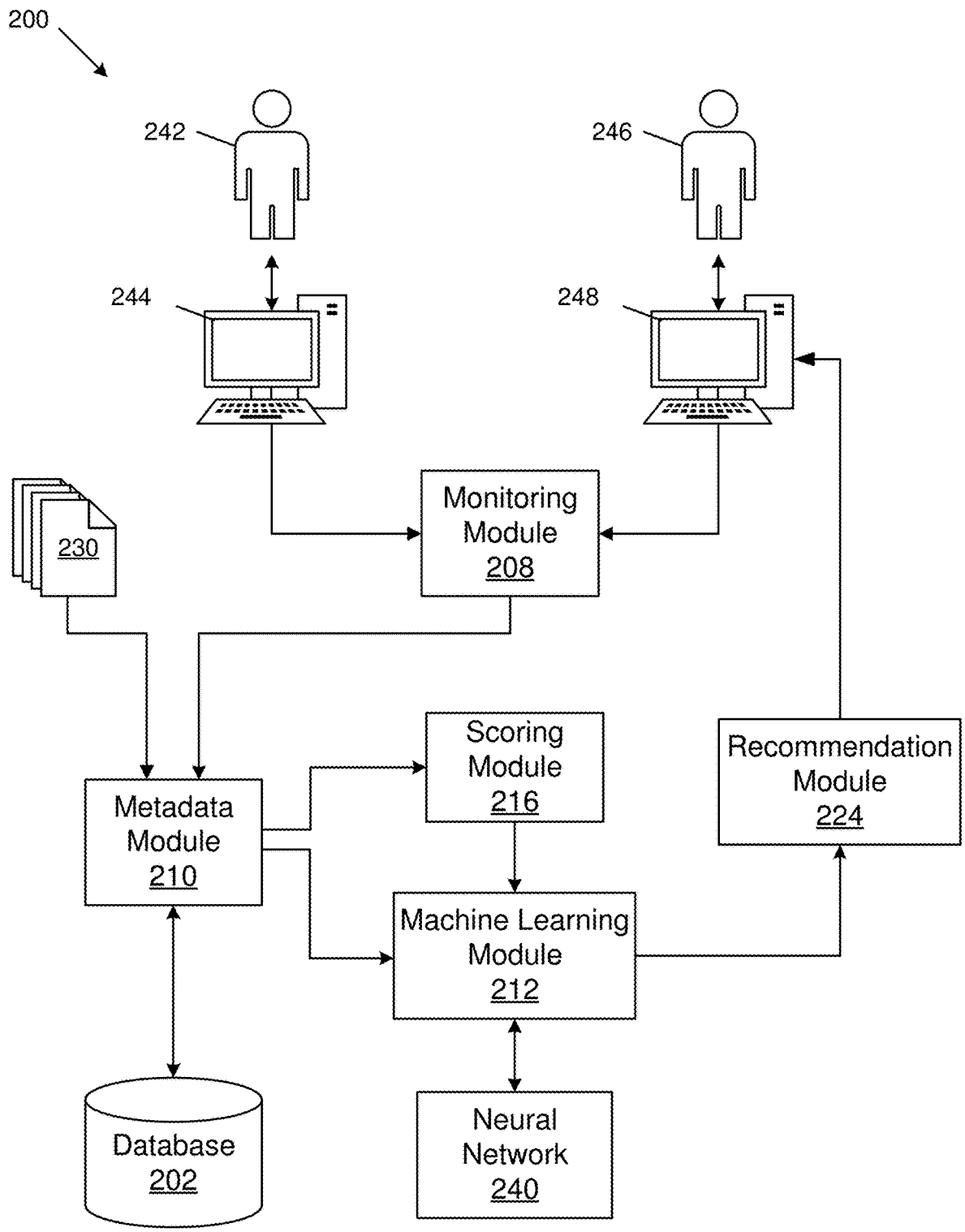
FIG. 2B illustrates a view of the simulation-based learning platform according to an embodiment herein.
Figure 2C:
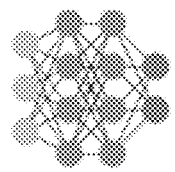
FIG. 2C illustrates sample neural networks that may be used in a simulation-based learning platform.
Figure 2C:
Figure 2C:
Figure 2C:
Figure 2C:
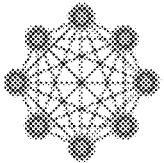
Figure 2C:
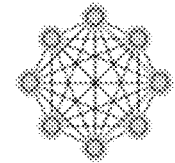
Figure 2C:
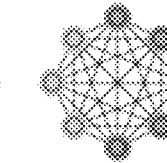
Figure 2C:
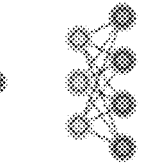
Figure 2C:
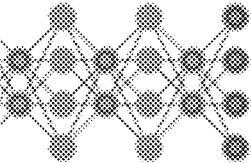
Figure 2C:
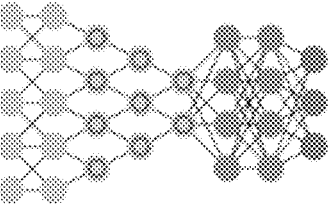
Figure 2C:
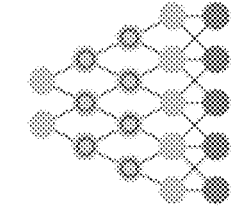
Figure 2C:
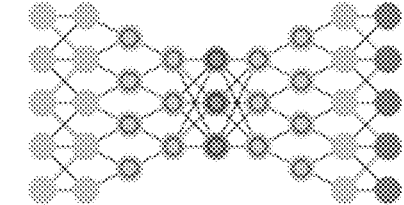
Figure 2C:
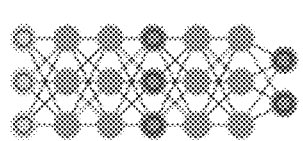
Figure 2C:
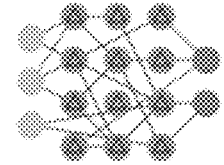
Figure 2C:
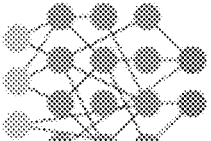
Figure 2C:
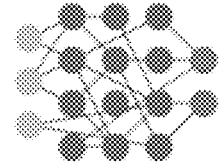
Figure 2C:
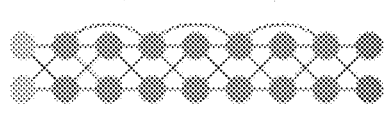
Figure 2C:
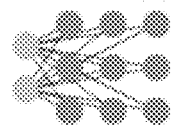
Figure 2C:
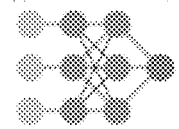
Figure 2C:
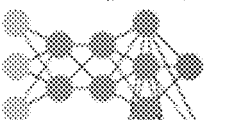
Figure 2D:
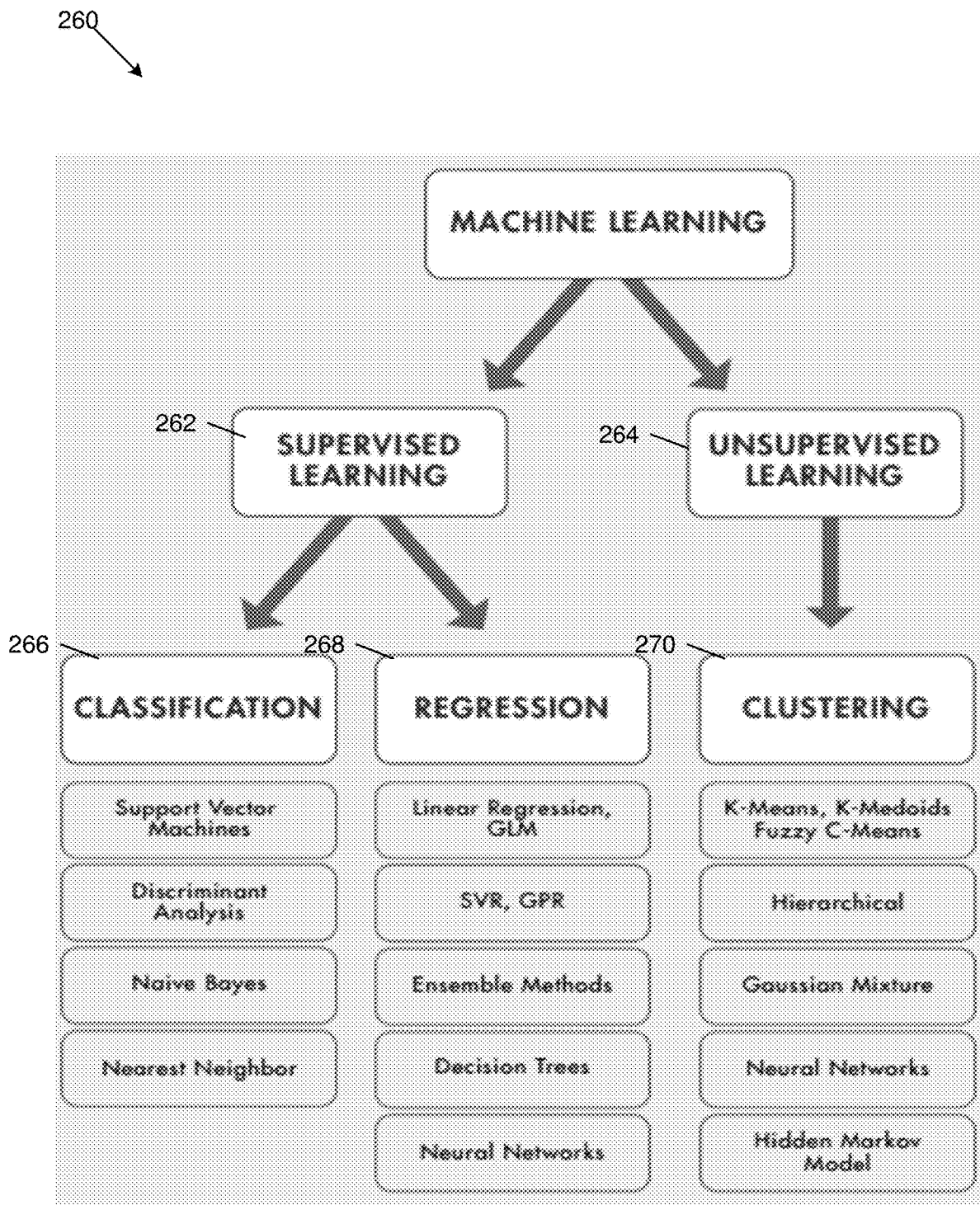
FIG. 2D illustrates a schematic diagram of supervised and unsupervised machine learning.

FIG. 2D illustrates various examples of machine learning algorithms 260 that may be used for both supervised 262 and unsupervised 264 learning. While specific examples are illustrated in FIG. 2D, any appropriate machine learning algorithm, in light of the subject matter disclosed herein, may be used. For example, classification algorithms 266 may include support vector machines, discriminant analysis, naïve Bayes, and nearest neighbor algorithms that be used for supervised learning. Similarly, various regression algorithms 268 such as linear regression, GLM, SVR, GPR, ensemble methods, decision trees, and neural networks may be used for supervised learning. For unsupervised learning, various clustering algorithms 270 may be used such as K-means, K-medoids, fuzzy C-means, hierarchical, Gaussian mixture, neural networks, and hidden markov model.

One algorithm that is discussed in detail herein is the neural network 240, and in particular an artificial neural network (ANN 240). An ANN 240 is modeled over the functioning of a human brain. The ANN 240 is designed and trained using sets of historical data over previous patterns of the data. As applied herein, for example, the ANN 240 may be trained using historical data for previous users' attempts to complete challenges/simulated tasks for a course. After the ANN 240 is trained, when the metadata module 210 tracks new data for a user 102 attempting to complete a challenge/simulated task, the ANN 240 takes the new data and generates an optimal recommendation, hint, suggestion, and/or the like for completing the challenge/simulated task.

FIG. 2C illustrates 250 different neural networks 240, and configurations of neural networks 240 that may be used in the simulation-based learning platform 106 to process the tracked data and to optimize and tailor the user's learning path for the most effective learning for the user 102, and the expert's reference path. As shown in FIG. 2C different types of neural networks 240 may be used such as feed-forward neural networks, perceptron neural network, recurrent neural network, and/or the like. As discussed above, FIG. 2A illustrates the different layers of each neural network 240 including the input, processing, and output layers.

Referring to FIG. 2A, as described herein, the simulation-based learning platform 106, in one embodiment, uses a supervised learning approach to using the neural network 240. The objective of the ANN 240 is to optimize the user's learning patterns for achieving a desired result for a course by completing challenges/simulated tasks. For instance, a user 102 may provide profile data, e.g., static data such as the user's age, gender, experience levels, and/or the like. The metadata module 210 also tracks data for the user's interactions as they use the simulation-based learning platform 106 and attempt to complete challenges/simulated tasks. The data is then provided to the machine learning module 212, which feeds the data to the trained ANN 240. The ANN 240 processes the data and provides one or more recommendations for the user's learning path that is tailored specifically to the user 102 based on the user's profile and interaction data. The ANN 240 may also process the expert's/other user's data to optimize the reference path for the expert. In other words, the ANN 240 learns as the users learn, and becomes more accurate and efficient over time as the simulation-based learning platform 106 is used and more data is collected. Thus, the computer in general, and the ANN 240 in particular, learns and adapts over time by leveraging large data sets of static and dynamic data from various users of the simulation-based learning platform 106.

When the neural network 240 is trained, in one embodiment, the machine learning module 212 uses the neural network 240 as an engine for optimizing the user's learning path by generating recommendations, hints, suggestions, and/or the like for enhancing the user's learning experience, and/or optimize the expert's reference path to generate a new and better reference path. In such an embodiment, the neural network 240 may be deployed as a back-end server, and may receive data continuously over a network 108. When the simulation-based learning platform 106, in one embodiment, is trained, it continuously receives data for a user 102, and when the amount of data that is received satisfies a predefined threshold (e.g., a minimum amount of data), the ANN 240 automatically generates information for optimizing the user's learning path and/or the expert's/other user's reference path. In certain embodiments, the received data may be a subset of the full set of available data, and the ANN 240 may process the subset of data to ensure that the processing will result in meaningful, new, and/or valid results prior to processing the full set of data.

Figure 2E:
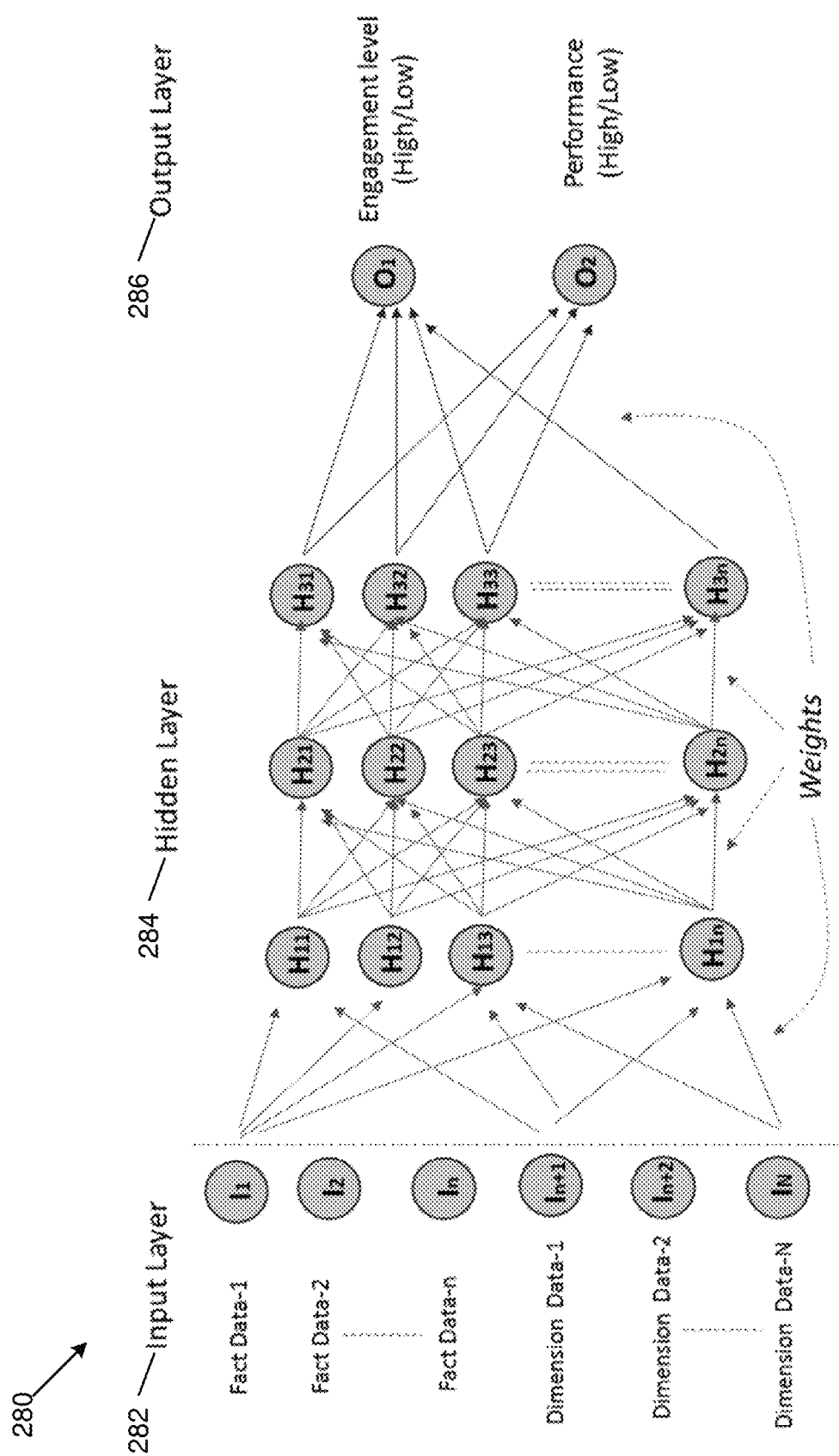
FIG. 2E illustrates sample layers of artificial neural networks.

The ANN 240, in one embodiment, may include a number of different layers 280, as illustrated in FIG. 2E, such as an input layer 282, hidden processing layers 284, and an output layer 286. The input layer 282 receives the data that the metadata module 210 collects from the user based on the user's interactions with the simulation-based learning platform 106 and feeds the input to the processing layers. The processing layers 284, in one embodiment, has multiple different nodes, e.g., processing units, devices, modules, and/or the like, that are configured to transform the received data and output the transformed data into subsequent processing nodes as input, and so on. The ANN 240 is considered trained when a set of weights are determined that minimizes the errors between the estimated results of the processing layers and the actual results. The weights are stored and used for later processing on new data sets as the user 102 uses the simulation-based learning platform 106. The weights are used to determine the proficiency level of the user 102 and whether recommendation should be generated for the user 102, what kinds of recommendations should be generated, and/or the like.

Referring to FIG. 2A, in one embodiment, the machine learning module 212 is configured to compare the tracked data from the user's interactions with one or more reference paths for the one or more simulated tasks to determine one or more recommendations for optimizing the user's learning path. For instance, the machine learning module 212 may compare the tracked data to an expert's/other user's reference path for the challenge/simulated task that is being performed to determine if the user's interactions are similar to the expert's decisions. An expert, as used herein, may be a subject matter expert for the particular field or course.

For example, in the field of data analytics, the expert may log on to the simulation-based learning platform 106 to add expert subject matter content with respect to the data-analytics problem area and a real life data-analytics project scenario that he/she would have solved. The real-life business problem is then converted and presented into a business case, e.g., a simulation, based on live data provided by the expert that can be systematically solved by applying data analytics concepts and methodologies. The expert may then go through the steps of solving the problem in the best possible manner and explaining in detail each step and the approach for each step, which is all recorded for future reference and comparison. The expert's approach to the problem can then be used as a reference benchmark for other users 102 who are trying to solve the challenge/simulated task. The machine learning module 212 may then use this information to provide recommendations to the user for optimizing the user's learning path as compared with the expert reference path.

In certain embodiments, the simulation-based learning platform 106 allows the user to take multiple different paths via scenarios that the user 102 runs, and allows the user 102 to fail multiple times. The user 102 has complete flexibility to proceed at their discretion. The machine learning module 212 tracks all user steps and intelligently shows directional paths to the user 102 without giving away the solution, thus forcing the user 102 to work to progress to solve a challenge/ simulated task, in the process making the learning path faster, more accurate, and with a higher retention of learned skills and techniques that are applicable to real-life problems.

In one embodiment, the machine learning module 212 compares the user's interactions with segments of users at a given point in time and over time. In such an embodiment, an external user category/segment input may be dynamically created based on certain user profile parameters. For instance, the user may be compared to other users who have similar expertise levels and profiles or varying deviations in the expertise levels and profiles at a given time and over time. In such an embodiment, each user interaction is recorded at a given point in time and across different timelines as the user 102 progresses through milestones and levels. A plurality of other users' actions are also recorded at a given point in time and across multiple timelines.

While a user 102 progresses through his/her learning path, the machine learning module 212 records and generates live reports, in real time, on the user's ability to learn, understand, think, and/or solve a given challenge/simulated task, and categorizes the user based on the time spent on learning and applying the concept and the speed with which the user is progressing through various levels in the course. This information is continuously measured against reference paths for peer users, experts, real-time live data from other users, and/or the like. The machine learning module 212 calculates the deviation from the median or best practices approach for every action that a user attempts.

In one embodiment, the machine learning module 212 acts on a subset of all available data for a user 102 to pre-process the data and ensure that the data is sufficient for processing by the ANN 240. For instance, the machine learning module 212 may receive a table view of a database, or other subset of data from a data store, and pre-process the data to check if the data is sufficiently different, new, or the like to generate new recommendations, hints, content, and/ or the like that would be useful for the user 102. The machine learning module 212, for instance, may use the current subset of data and run statistical analyses against the previous data set to determine whether there are differences/ deviances between the current and previous data sets to warrant fully processing the data.

Over time, the ANN 240 continues to learn and becomes more capable to systematically categorize the inputs to generate effective recommendations, feedback, hints, and/or the like while comparing and evaluating the deviation in the steps that the user 102 is performing versus the expected flow of actions. The information associated with the various paths that the machine learning module 212 analyzes, e.g., user usage data, user profile data, and/or the like also becomes a repository of data for human behavioral research and how the users' critical thinking abilities are manifested in applying analytical approaches to solve real life challenges. The timing at which the feedback is provided to the user 102 during the course is also determined by the ANN 240, based on the user's progress and interactions through the course, so that the feedback is provided at the best time to optimize the user's learning. In this manner the user's learning path can be tailored specifically for the user 102.

The frequency with which the system provides feedback is determined as a function of the determined deviation from the reference path. The simulation-based learning platform 106 may train, coach and guide the user 102 towards perfecting the skill and the knowledge improving the learning curve effectively and efficiently making the feedback/ hints contextual and relevant. Over time, because of the richness of information gathered from users 102, the ability to customize directions in terms of mapping for the user's learning needs and timing improves. This results in the enhancement of data-analytics training effectiveness for a user and efficiently scaling up for larger set of users by maintaining the same level of training effectiveness.

In one embodiment, the machine learning module 212 compares the user's interactions with the user's 102 own progress over time as measured through quizzes/tests, choice of functions/steps and timing of the choices, user notes, user comments, user revisions and corrections, the user's use of hints/suggestions/tips/etc., and/or the like.

In one embodiment, the recommendation module 214 is configured to generate recommendations for optimizing the user's learning path based on the output from the machine learning module 212, e.g., from the ANN 240. For example, the recommendations may be studying different portions of the course material, working with a different user 102 on a challenge/simulated task, replaying the steps for a particular user, and/or the like. In some embodiments, the recommendations may include suggestions, hints, instruction, advice, and/or the like for performing one or more simulated tasks using less time, using a lesser number of steps, using the most effective steps, and/or the like.

The recommendation module 214, in one embodiment, generates one or more hints, suggestions, and/or the like to solve the at least one challenge selected by the user 102. The one or more hints are provided to the user 102 (i) upon receiving one or more prompts from the user 102, (ii) at predetermined time intervals based on one or more steps taken by the user 102 to solve the challenge, (iii) based on a user level, (iv) one or more administrative settings, and (v) a user proficiency.

For example, the recommendation module 214 may be chosen during such modes of training that may render an appropriate hint for helping the user progress and one or more instructions to the user 102, (i) when the user 102 prompts for a hint or (ii) when the system requires an appropriate time to provide a hint based on a learning path taken by the user 102. For example, the outcome of the hint that the user 102 uses is communicated to the scoring module 216, described below, and evaluated to arrive at final score for the challenge/simulated task.

In one embodiment, the user's learning path may become the expert learning path and may be used as a reference path for other users of the simulation-based learning platform 106. For instance, because the machine learning module 212 and the ANN 240 are constantly learning and maturing over time as more users use the simulation-based learning platform 106 and more data is collected and analyzed, different recommendations for a learning path may be generated for the same challenge/simulated task. In other words, for example, two different users may be equally successful with an end result, but the users could have achieved the result through different learning paths.

Furthermore, in some embodiments, a user 102 can challenge the expert approach to completing the challenge/simulated task. In one embodiment, in order to qualify to challenge the expert, the user 102 has to achieve a threshold score for their solution to the challenge/simulated task, e.g., an 80% of the total available score, 100 points, or the like. In another embodiment, the user's learning path is continuously compared, e.g., in the background, to the expert learning path to determine whether the user's learning path is more successful than the experts. A more successful learning path may include taking less steps or time to complete a challenge/simulated task, a simplicity of the steps used to complete the challenge/simulated task (e.g., whether a novice or expert user can perform the steps), and/or the like. If the user's learning path is determined to be more successful than the expert learning path, the user's learning path may become the expert learning path for the particular challenge/simulated task. In this manner, the expert learning path is constantly evolving and becoming more efficient and accurate as the ANN 240 becomes more mature through more users using and interacting with the simulation-based learning platform 106.

The scoring module 216, in one embodiment, is configured to score the at least one challenge based on the determined deviance of the user from the reference path to obtain a score, as described above. The score is calculated based on one or more parameters selected from a group that may include dimensions such as: (i) a time taken to solve the at least one challenge, (ii) a sequence of steps/interactions taken, (iii) usage of the one or more functions in the one or more steps/interactions to solve the at least one challenge/simulated task, (iv) one or more hints used to solve the at least one challenge, (v) exhaustiveness of functions among other parameters to arrive at user score, (vi) answers to intermediate questions within the at least one challenge and at end of the at least one challenge, (vii) comparison to reference paths, (viii) performance of user on non-guided (open book) challenges, etc.

The display module 218, in one embodiment, is configured to present course material, the challenge/task information, the recommendations, and/or the like within an interface specifically designed for allowing the user 102 to see and compare their progress as compared to the baseline or reference path, e.g., the expert path. For instance, the metadata module 210 may track the user's progress through the course and/or challenge/simulated task, and the display module 218 may display a progress indicator indicating the user's progress through the course and/or challenge/simulated task. The progress indicator, in one embodiment, may include at least one of (i) the progresses of the user 102 associated with the at least one challenge/simulated task, or (ii) a comparison of a performance between (i) the user 102 and the one or more experts, (ii) the user 102 and the one or more users, or (iii) combinations thereof. The display module 218 can be configured to display usage and performance data for a set of predefined or selected users 102, e.g., in response to a request or configuration by a system administrator.

The code integrating module 220, in one embodiment, is configured to automatically convert the user interactions for performing the one or more simulated tasks into code for one or more programming languages. For example, if the selected course is an analytics course, as the user 102 goes through the steps for performing a data analytics task, e.g., manipulating data within a spreadsheet, the code integrating module 220 may automatically convert the user's steps/actions to SAS code, R code, Python code, Julia code, an Excel® macro, or code for some other statistical software package so that the user can learn, use, and reuse the generated code without having to write the code from scratch. For instance, when the user 102 clicks on a button or enters text into a text input box, the code integration module 220 converts the action to a mouse click event or a text input box event in the respective programming language.

The gaming module 222, in one embodiment, is configured to assign the user 102 scores, as determined by the scoring module 216 for example, during the user's performance of the challenges/simulated tasks. The gaming module 222 is further configured to compare, in real-time, the user's scores during the user's performance of the one or more simulated tasks with score for other users who are performing the same or substantially similar simulated tasks. For instance, the gaming module 222 may present a leaderboard that shows the user's score along with the scores for other users who are performing the same challenge and/or are going through the same course as the user 102. The gaming module 222 may further be configured to provide the user 102 with badges, trophies, achievements, certificates, and/or the like for reaching certain milestones, performing tasks correctly/efficiently, and/or the like as a way to motivate and encourage the user 102 to continue going through the course, challenge, project, case, and/or the like.

The gaming module 222, in one embodiment, uses the recommendations that the recommendation module 214 generates to optimize one or more motivational factors for individual users. For example, if a recommendation includes the user 102 reading a chapter in a course book prior to attempting a challenge/simulated task, the gaming module 222 may generate achievements, badges, points, credits, and/or the like that the user 102 can receive in response to reading the recommended chapter from the course book.

The collaborating module 224, in one embodiment, is configured to facilitate communications and real-time/dynamic work flows between the user 102 and one or more other users who are performing the same simulated tasks. For instance, the collaborating module 224 may allow users to chat or send other messages while they are working on a challenge or simulated task, may allow users to provide hints or suggestions to each other, may allow users to collaborate with other users by giving them permission to access their solution paths for certain challenges and help them optimize/correct those solution paths manually, may allow expert users to view and edit the trainee user's 102 selected steps for completing challenges/simulated tasks, and/or the like. The collaborating module 224 may also be configured to allow users to work together as a team to complete a challenge/simulated task.

FIG. 2B illustrates an example 200 of the flow of data through the simulation-based learning platform 106. In one embodiment, a user 246 that is training uses the computing device 248 to login to the simulation-based learning platform 106 that is located either locally on the device 248 or is remotely accessible through a web browser to access the simulation-based learning platform 106 over the internet. After the user 246 has selected their course of study and the challenges/simulated tasks that the user 246 wants to undertake, the monitoring module 208 monitors and records the user's interactions during the user's performance of the challenges and the metadata module 210 tracks data that describes the user's interactions.

In further embodiments, an expert user 242 performs the same or substantially similar tasks as the user 246 that is training using another computing device 244. In such an embodiment, the monitoring module 208 monitors and records the expert's interactions during the expert's performance of the challenges and the metadata module 210 tracks data that describes the expert's interactions. In various embodiments, data 230 that is associated with previous performances of the selected challenge may be incorporated by the metadata module 210. Previous performances may be provided by experts, peers of the user 246, and/or other users. The data may include the steps that the other users took to complete the challenge, the amount of time it took the other users to complete the challenge, profile information for the other users, and/or the like.

The metadata module 210 may store the tracked and collected data in a database 202 and also provide the data to the machine learning module 212. In further embodiments, the metadata module 210 provides the data to a scoring module 216 to determine a deviance score for the user's 246 performance as compared to the expert's 242 performance for completing the challenge/simulated task. The scoring module 216 may provide the score data to the machine learning module 212 for use in optimizing the user's 246 learning path as compared to the expert's 242 reference path.

The machine learning module 212, in certain embodiments, provides the data to a neural network 240 as input, which processes the data to optimize the user's learning path associated with the challenges/simulated tasks that the user 102 is working on. The optimized data is provided to the recommendation module 224, which generates, dynamically and in real-time, one or more recommendations, hints, suggestions, and/or the like for the user 246 and provides the recommendations to the user 102. The data flow in FIG. 2B occurs in real-time, and on an on-going basis, as the user works on the challenge/simulated task so that the user 102 is provided with timely and applicable recommendations to help solidify the user's learning and ultimately increase the user's learning capabilities.

FIG. 3 illustrates a user interface view 300 of interaction with the simulation-based learning platform 106 through a computing device for data oriented learning according to an embodiment herein. The view 300 includes a category field 302A, a specification field 302B, a classification field 304, a review challenge field 306, and a solve challenge field 308. In one embodiment, when a user clicks on the category field 302, one or more categories (e.g., a financial service industry) are displayed. The specification field 302B provides information regarding a domain (e.g., finance, and retail) of learning. The classification field 304 classifies an industry (e.g., consumer banking).

In one embodiment, one or more challenges/simulated tasks with corresponding statuses (e.g., review, resume, solve) for a user action are displayed. The review challenge field 306 helps to review a challenge previously completed by a user 102. For example, a challenge completed by a user 102 may be reviewed, replayed, restarted, and/or the like. The solve challenge field 308 displays one or more challenges that may be solved. For example, when a user clicks on the solve challenge field 308, the user 102 can proceed with performing the required tasks for completing the challenge/simulated task. In one embodiment, a title of a challenge and a corresponding description may be displayed to the user 102. In one embodiment, the user 102 may resume with a challenge at an interrupted stage (e.g., when a user pauses before completion of the challenge) by clicking on 'a resume challenge' field.

Figure 4:
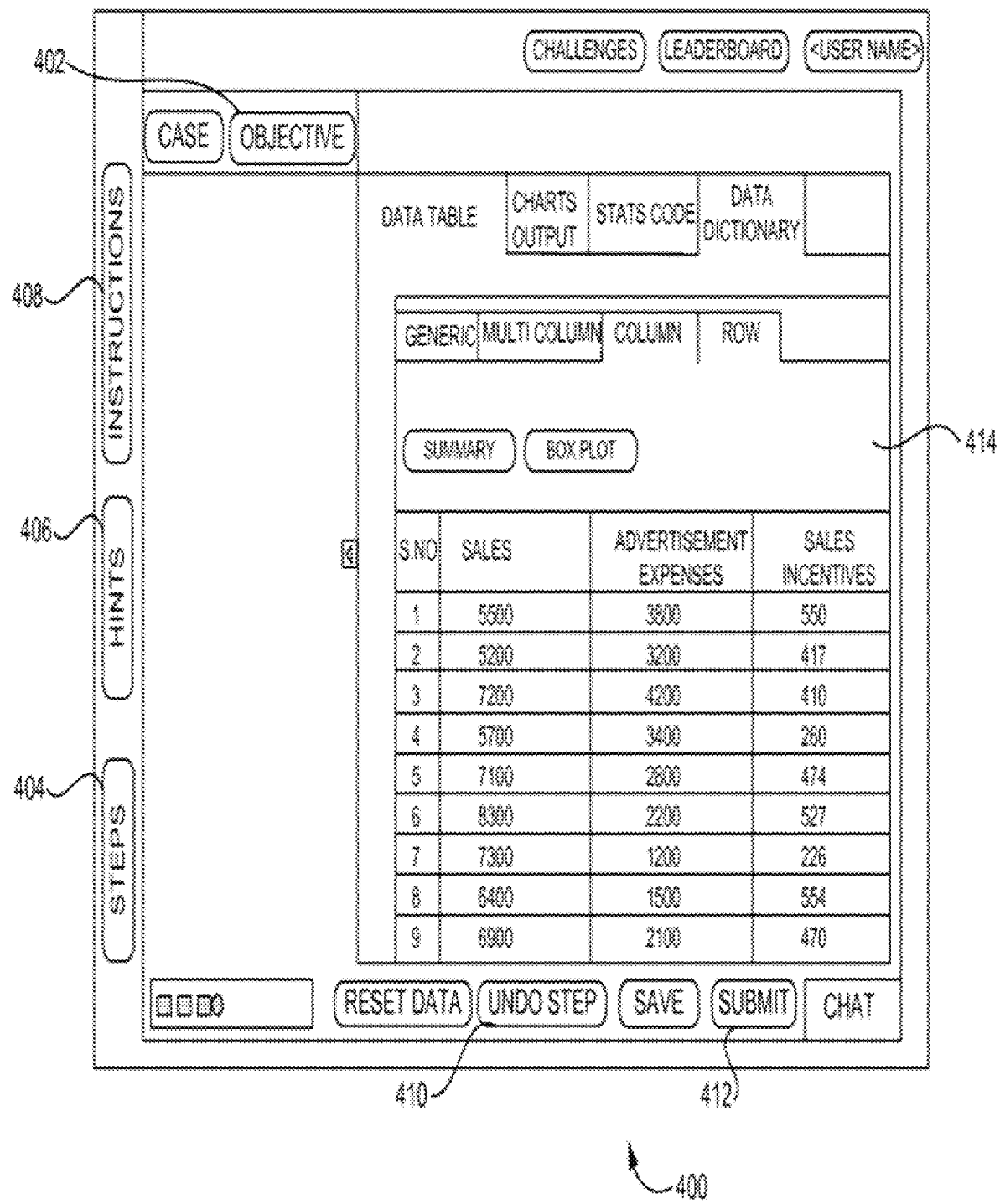
FIG. 4 illustrates a user interface view of a user solving an at least one challenge to achieve an interactive-learning according to an embodiment herein.

FIG. 4 illustrates a user interface view of a user 102 solving a challenge/simulated task to achieve an interactive-learning according to an embodiment herein. The view includes an objective field 402, a steps field 404, a hints field 406, an instructions field 408, an undo step field 410, a submit field 412, and datasets field 414. In one embodiment, when a user 102 clicks on a case field which displays a business case. For example, the case field explains business problem, analytics problem, client's dilemma, overall expectation of a client, and an overview of what a data represents. In one embodiment, a data dictionary field provides information corresponding to one or more data items in the column for a particular challenge/simulated task. In one embodiment, data is a sample of a customer base having three identifiers (ID). For example, (i) a household ID which represents a unique identifier for the household (one household can have multiple customers and each customer can have multiple accounts), (ii) a customer ID which represents a unique customer, and (iii) an account ID which represents an account.

In one embodiment, when a user 102 clicks on the objective field 402 a list of objectives for the challenge is provided. For example, the user 102 may need to solve an analytics problem that has three objectives 'objective 1', 'objective 2', 'objective 3'. In another example, an objective may be to determine which of following factors (i) household size, (ii) household age, (iii) home ownership status, (iv) marital status, (v) wealth segment, and (vi) vintage of the relationship have influence on a volume of a household deposit balance with a bank and an overall deposit balance respectively.

In one embodiment, when a user 102 clicks on the steps field 404 one or more steps/interactions performed by the user 102 to solve a challenge/simulated task are displayed and the steps/interactions are updated in real-time as the user modifies the steps/interactions. In one embodiment, when a user 102 clicks on the hints field 406, a hint may be displayed for completing a challenge/simulated task and assist the user to progress further to complete the challenge/simulated task. In one embodiment, when a user 102 clicks on the instructions field 408, the instruction for solving the challenge/simulated task is conveyed to the user. In one embodiment, when a user 102 clicks on the undo step field 410, the platform helps to undo a particular step when an error occurs while performing a challenge/simulated task. In one embodiment, the user 102 clicks on the submit field 412 once he/she completes all the involved within the challenge/simulated task. In one embodiment, the user 102 may chat with other user/trainee/experts while taking up the challenge/simulated task.

In one embodiment, instructions describe how to break the challenge/simulated task into smaller parts for analysis. In one embodiment, the hints are requested by the user 102. For example, upon clicking on the hint icon, an appropriate hint is displayed to the user 102 based on user's current position. Similarly, 'functions' are the right steps which are recommended by an expert in order to successfully complete the instruction. In one embodiment, 'Context/Column' field represents the column/row/cell on which the recommended 'function' may be performed. In one embodiment, 'Blacklisted rules' represents actions that the user 102 should avoid and in which points are deducted for performing those actions. In one embodiment, a chart output field displays output to the user 102 in a chart format.

Figure 5:
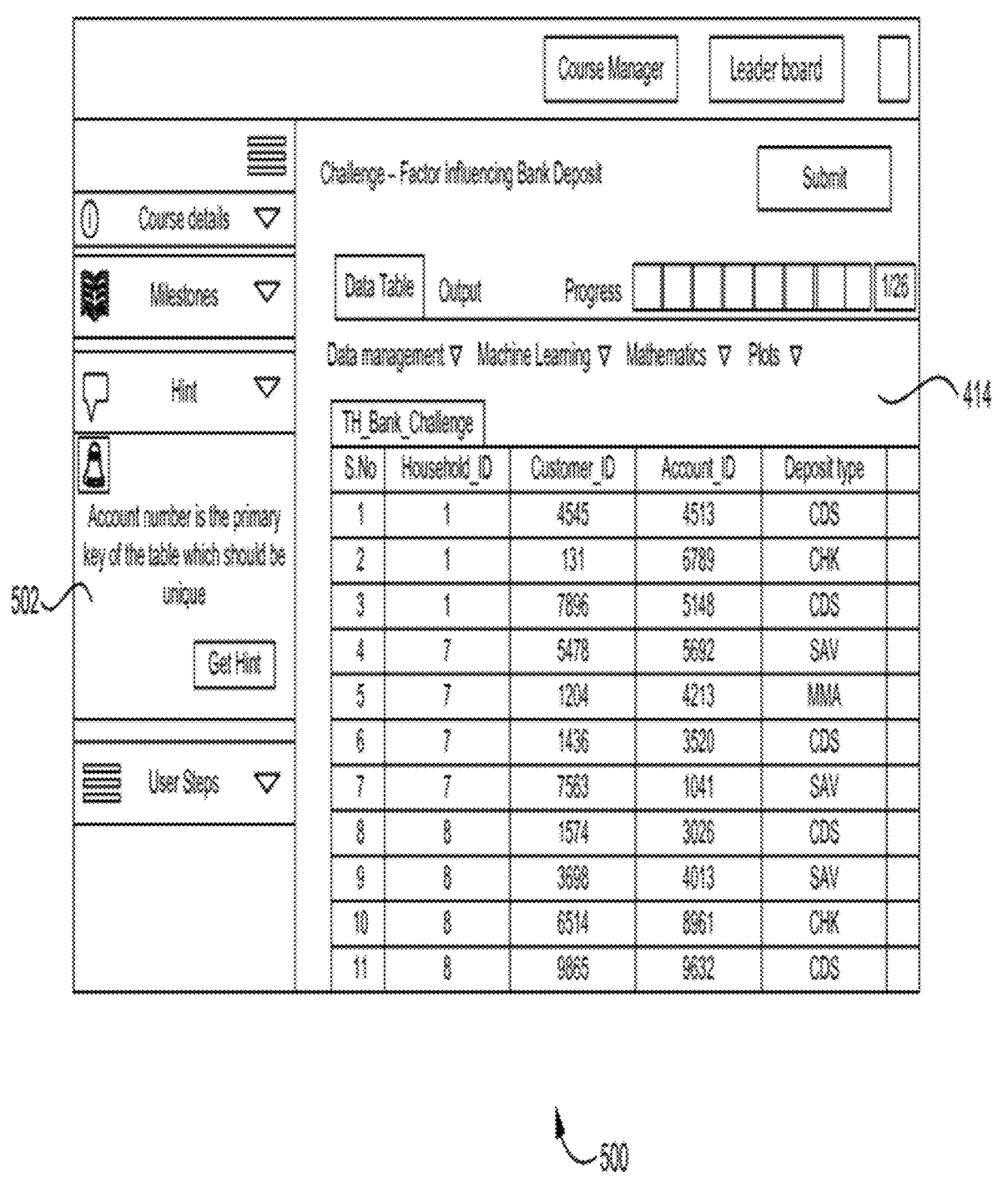

FIG. 5 illustrates a user interface view of receiving one or more hints while solving the at least one challenge/simulated task according to embodiments herein. The view 500 includes a hint rendering field 502. The hint rendering field 502 renders one or more hints to the user 102 while solving the at least one challenge/simulated task. For example, while the user 102 is solving a bank challenge, one or more hints may be provided such as "Account number is the primary key of the table, which should be unique". There is a provision for the user 102 to access one or more hints if the one provided is not helping the user 102 to solve the one or more steps associated with the at least one challenge/simulated task.

Figure 6:
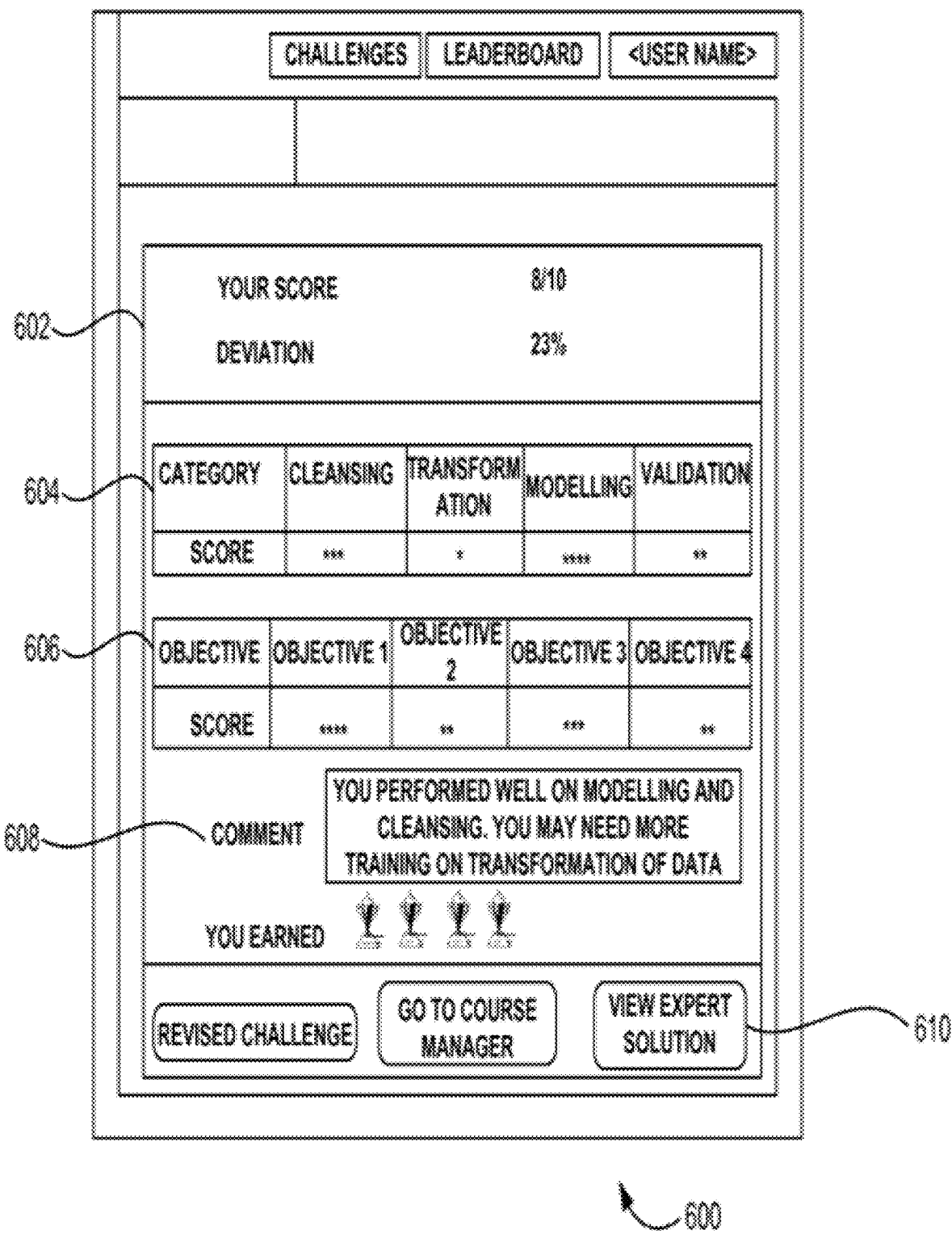
FIG. 6 illustrates a user interface view of a user score sheet for the challenge taken by a user according to an embodiment herein.

FIG. 6 illustrates a user interface view of a user score sheet for the challenge/simulated task taken by a user 102 according to an embodiment herein. The view 600 includes a score field 602, a category score field 604, an objective score field 606, a comment field 608, and a view expert solution field 610. The score field 602 displays a score and percentage of deviation achieved by the user 102 for a challenge/simulated task. The category score field 604 displays a score achieved by the user based on the category. Similarly, the objective score field 606 displays a score achieved by the user for corresponding objectives. The comment field 608 displays comments by an expert/system for the user score sheet and one or more approaches taken by the user 102 while solving the challenge/simulated task. In one embodiment, once the user 102 clicks on the view expert solution field 610, the user 102 is redirected to an expert solution page for corresponding challenges/simulated tasks. In one embodiment, the user 102 may compare execution steps of the user 102 with execution steps of an expert while performing a challenge/simulated task to determine a deviation in the user's steps from the expert's steps and to observe the expert approach to the challenge/simulated task.

Figure 7:
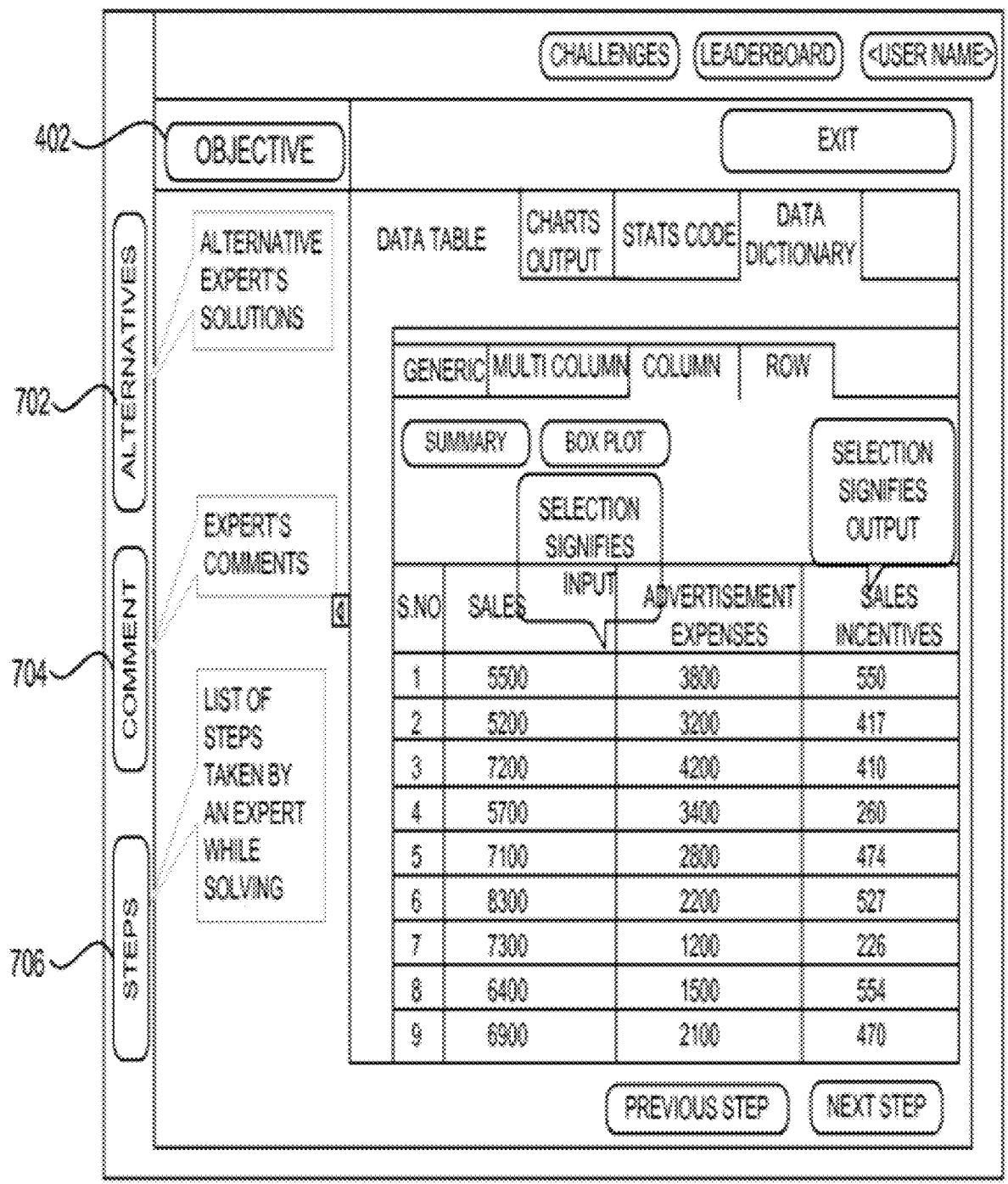
FIG. 7 illustrates a user interface view of an expert solution sheet for the at least one challenge according to an embodiment herein.

FIG. 7 illustrates a user interface view of an expert solution sheet for the at least one challenge according to an embodiment herein. The view 700 includes an alternatives field 702, a comment field 704, and a steps field 706. The alternatives field 702 provides an alternative expert solution for a particular challenge/simulated task performed by a user 102. The comment field 704 provides one or more comments as an expert solution for the challenge/simulated task to the user 102. The steps field 706 provides the one or more steps followed by an expert for a particular challenge/simulated task performed by the user 102. For example, a challenge/simulated task may include a table that includes information (e.g., sales revenue, advertisement expenses, sales incentives) about financial status of an industry. Selection of the sales column, for example, may signify an input and similarly selection of the sales incentives signifies an output. In one embodiment, the user 102 may click on previous step field 706 to view the previous steps performed by the expert for a particular challenge and similarly the next step field to view the next step performed by the expert for the particular challenge/simulated task.

FIG. 8 illustrates a user interface view of a consolidated rank sheet of the user 102 specific to one or more challenges/simulated tasks according to an embodiment herein. The view 800 includes a consolidated rank sheet 802, and a cumulative field 804. The consolidated rank sheet 802 displays the user 102 who has performed one or more challenges/simulated tasks with corresponding scores earned and the domain of learning. For example, users 'John', 'Paul', 'Robert' may be the top three ranked users for a challenge/simulated task in finance domain according to their respective score points earned. In one embodiment, the cumulative field 804 may be used to sort the rank sheet according to the user 102 based on cumulative score. Similarly, the rank sheet may be sorted based on the challenge/simulated task.

Figure 9:
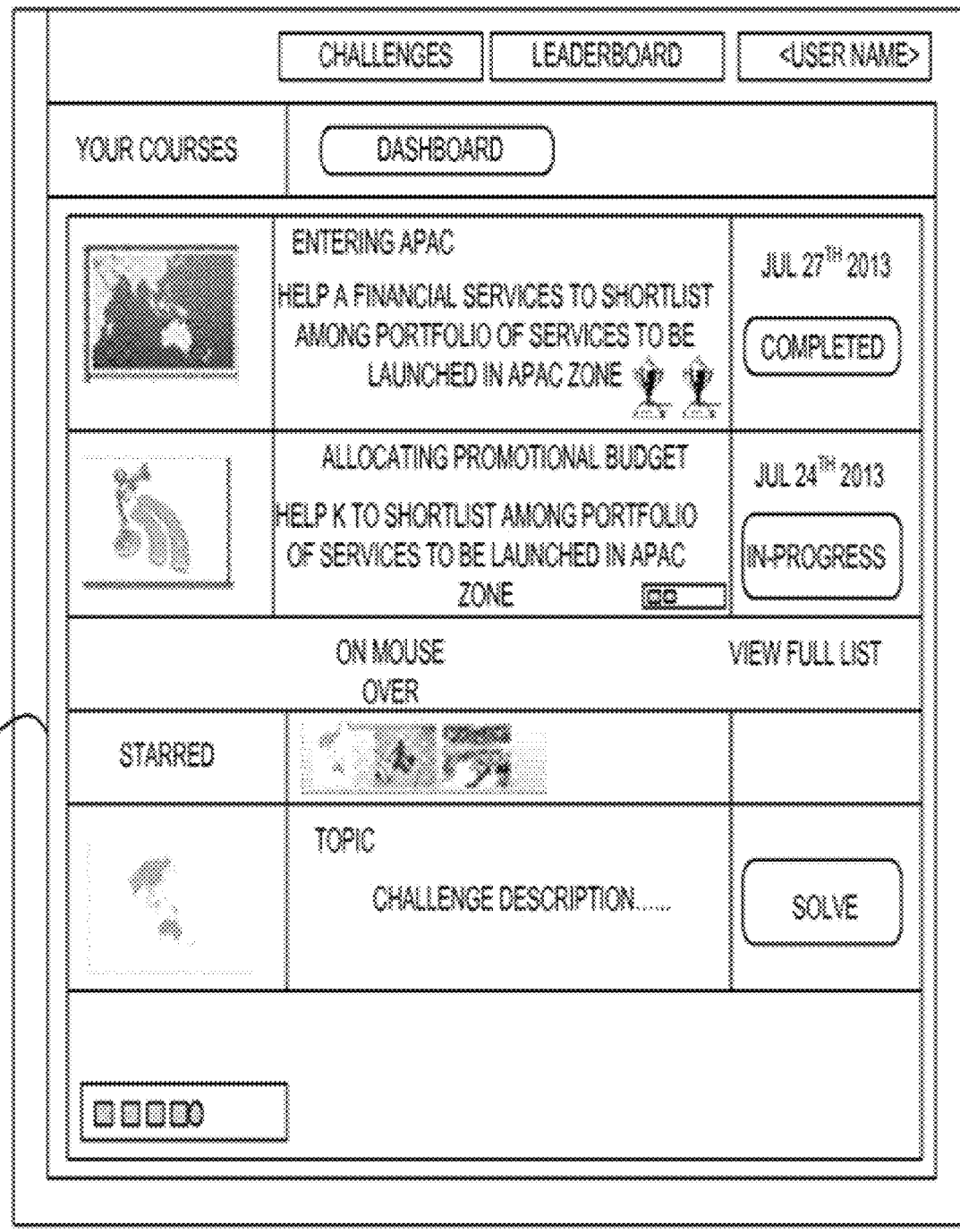
FIG. 9 illustrates a user interface view of an user profile sheet according to an embodiment herein.

FIG. 9 illustrates a user interface view 900 of a user profile sheet according to an embodiment herein. The view 900 includes a starred field 902. In one embodiment, the consolidated courses sheet displays lists of courses to the user 102 with their corresponding schedules. In one embodiment, the user 102 may add one or more courses to his/her profile (e.g., add to favorites) when he/she clicks on the starred field 902.

Figure 10:
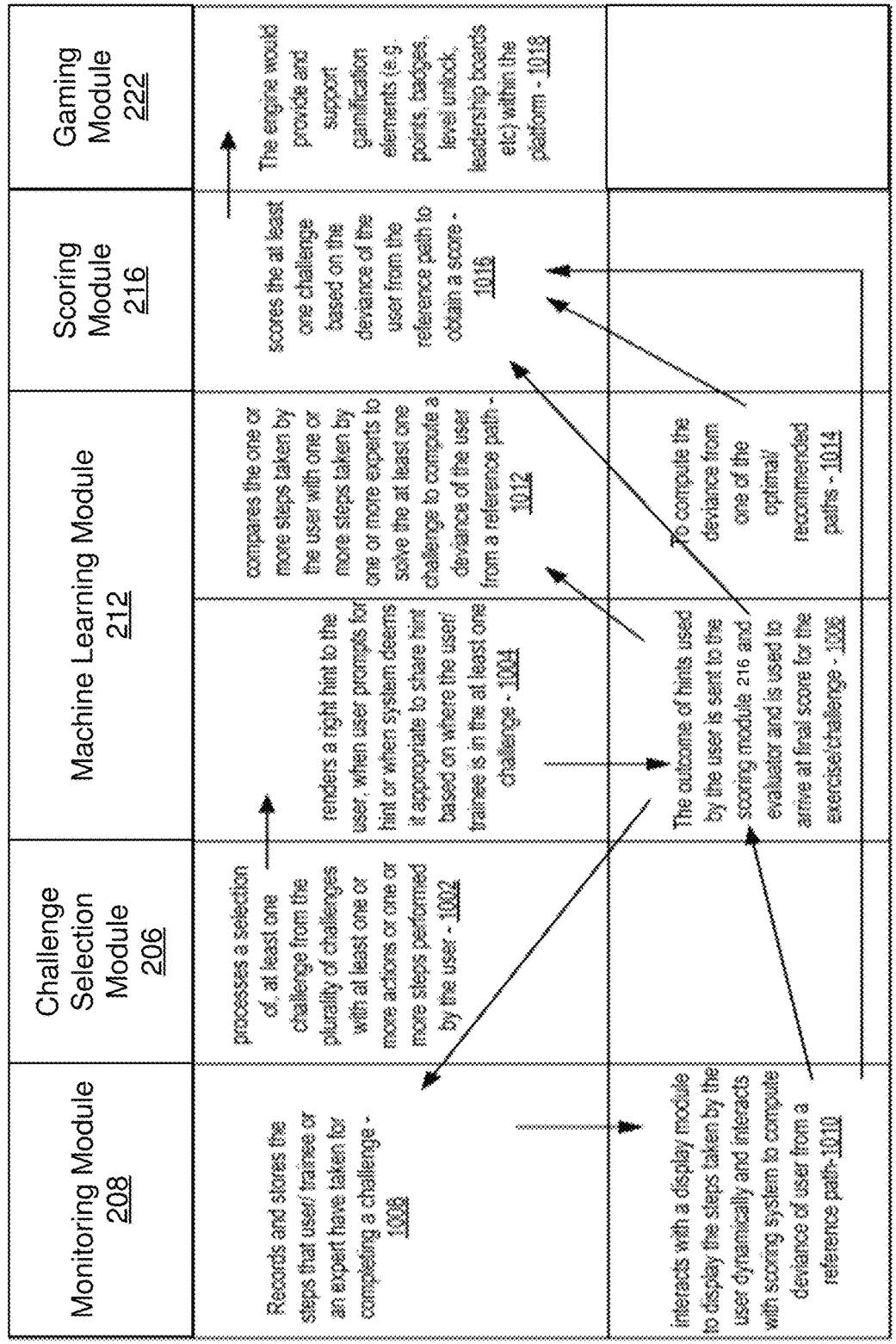
FIG. 10 is an interaction diagram illustrating a processor implemented method for training and scoring one or more challenges taken by a user using a simulation-based learning platform according to an embodiment herein.

FIG. 10 is an interaction diagram illustrating a processor implemented method for training and scoring one or more challenges/simulated tasks taken by the user 102 using the simulation-based learning platform 106 according to an embodiment herein. The interaction diagram 1000 includes a series of operations carried out during various stages of interaction between the challenge selection module 206, the monitoring module 208, the machine learning module 212, the scoring module 216, and the gaming module 222. In operation 1002, a user 102 performs one or more user actions/steps, which the monitor module 208 records. For example, a user action may be 'a user clicks' on solving at least one challenge from a plurality of challenges. In operation 1004, the hint and instruction module 212 may render a hint to the user 102, when the user prompts for a hint or when the machine learning module 212 deems it appropriate to share hint information based on where the user 102 is in the at least one challenge. In operation 1006, any hints used by the user 102 are sent to the scoring module 214 to determine the final score for the challenge/simulated task. In operation 1008, the monitoring module 208 records and stores the steps/interactions that user 102 or an expert have taken for completing a challenge/simulated task. In operation 1010, the monitoring module 208 interacts dynamically with a display module 218 to display the steps taken by the user and interacts with the scoring module 216 and/or the machine learning module 212 to compute a deviance of the user 102 from a reference path, e.g., an expert's path.

In operation 1012, the machine learning module 212 compares the one or more steps taken by the user 102 with one or more steps taken by one or more experts/set of other users to solve the at least one challenge/simulated task to compute a deviance of the user 102 from a reference path. In operation 1014, the machine learning module 212 computes the deviance from one of the optimal/recommended paths. In operation 1016, the scoring module 216 scores the at least one challenge based on the deviance of the user 102 from the reference path to obtain a score. In operation 1018, the gaming module 216 provides information for gamification elements (e.g. points, badges, level unlock, leadership boards, etc.) within the platform 106 based on the user's score(s).

Figure 11:
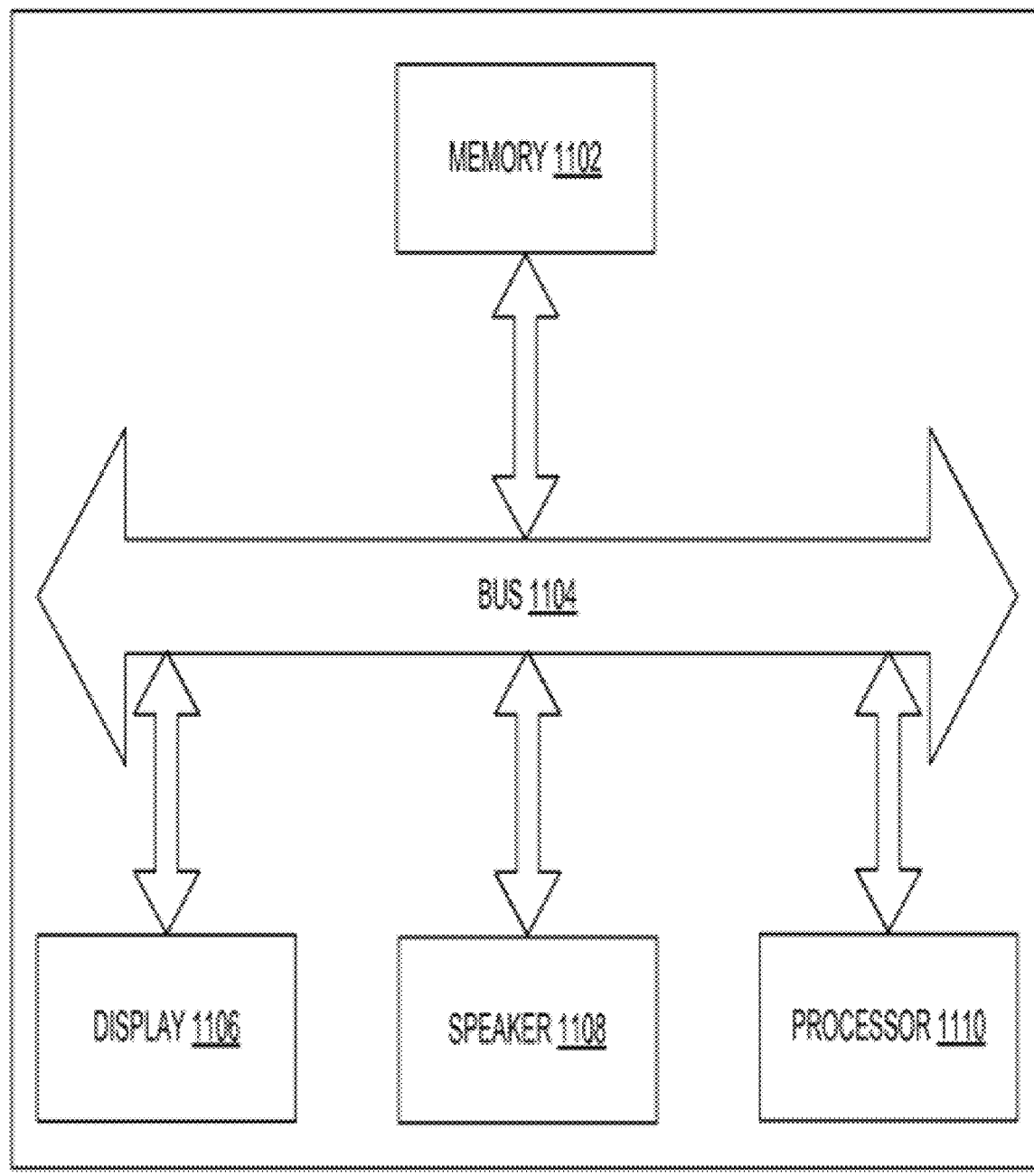
FIG. 11 illustrates an exploded view of the computing device having a memory with a set of computer instructions, a bus, a display, a speaker, and a processor capable of processing a set of instructions to perform any one or more of the methodologies herein, according to an embodiment herein.

FIG. 11 illustrates an exploded view of the computing device 104 having a memory 1102 that includes a set of computer instructions, a bus 1104, a display 1106, a speaker 1108, and a processor 1110 capable of processing a set of instructions to perform any one or more of the methodologies herein, according to an embodiment herein. In one embodiment, the receiver may be the computing device 104. The processor 1110 may also enable digital content to be consumed in the form of text material, or video for output via one or more displays 1106 or audio for output via speaker and/or earphones 1108. The processor 1110 may also carry out the methods described herein and in accordance with the embodiments herein.

Digital content may also be stored in the memory 1102 for future processing or consumption. The memory 1102 may also store program specific information and/or service information (PSI/SI), including information about digital content (e.g., the detected information bits) available in the future or stored from the past. A user of the computing device 104 may view this stored information on display 1106 and select an item of for viewing, listening, or other uses via input, which may take the form of keypad, scroll, or other input device(s) or combinations thereof. When digital content is selected, the processor 1110 may pass information. The content and PSI/SI may be passed among functions within the computing device using the bus 1104.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Figure 12:
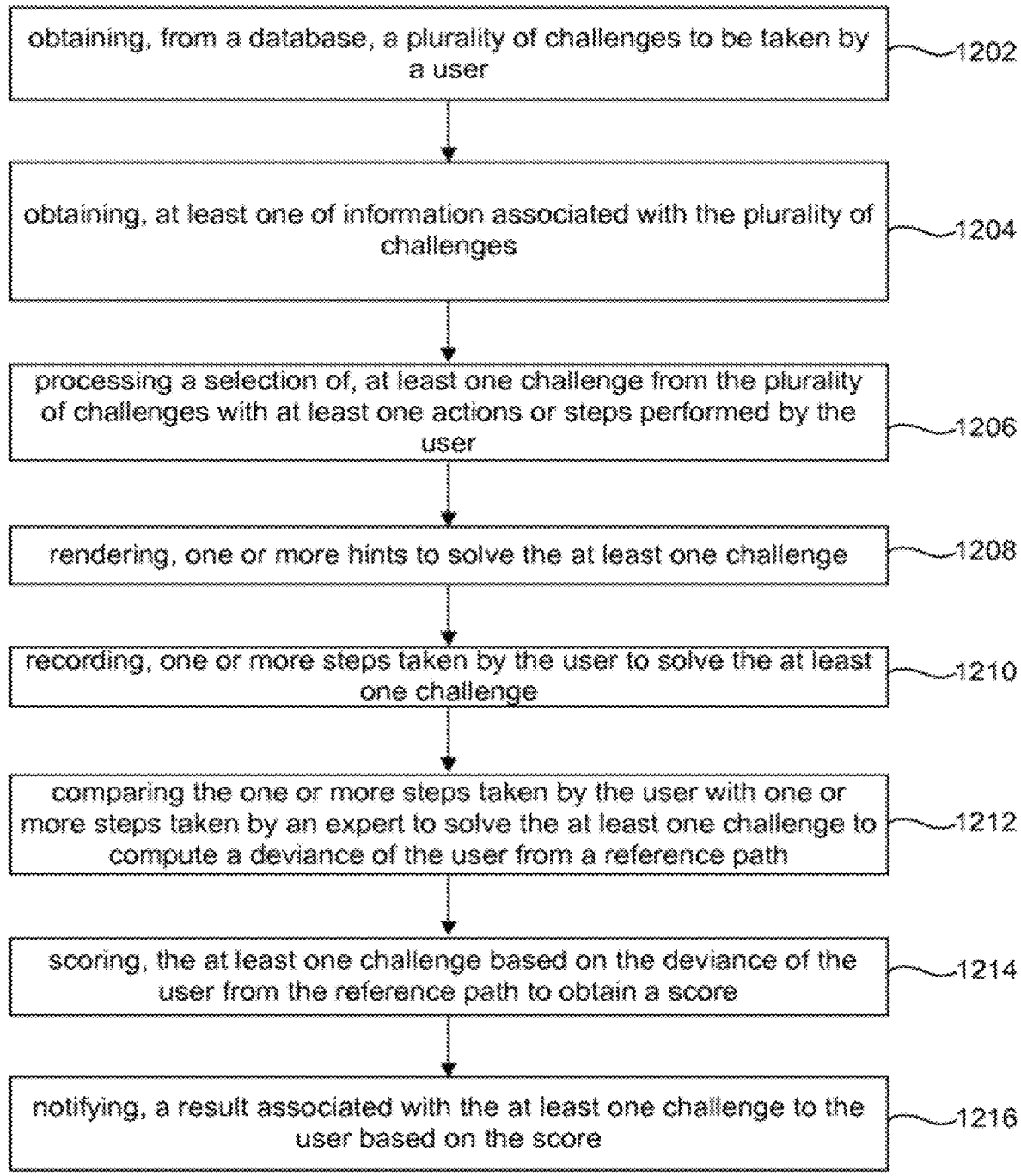
FIG. 12 is a flow diagram that illustrates a method for training and scoring one or more challenges taken by a user using a simulation-based learning platform according to an embodiment herein.

FIG. 12 is a flow diagram illustrates a method for training and scoring one or more challenges taken by a user using a simulation-based learning platform according to an embodiment herein. In step 1202, a plurality of challenges/simulated tasks to be taken by a user 102 is obtained from a database 202. In step 1204, at least one of information associated with the one or more challenges/simulated tasks is obtained. In step 1206, at least one challenge/simulated task from the plurality of challenges is processed by selection with at least one action or steps performed by the user. In step 1208, one or more hints to solve the at least one challenge is rendered. In step 1210, one or more steps taken by the user to solve the at least one challenge is recorded. In step 1212, the one or more steps taken by the user is compared with one or more steps taken by an expert to solve the at least one challenge to compute a deviance of the user from a reference path. In step 1214, the at least one challenge is scored based on the deviance of the user from the reference path to obtain a score. In step 1216, a result associated with the at least one challenge is notified to the user based on the score. The at least one of information associated with the plurality of challenges is selected from a group includes (i) a description, (ii) an objective, (iii) data sets that are created or provisioned, (iv) rules of navigation, (v) key steps, and (vi) success criteria among other related components.

The processor implemented method may further include providing one or more solutions are provided in a format selected from a group which includes (i) one or more audio, (ii) one or more video, (iii) one or more text, or (iv) a combination thereof. The processor implemented method may further include (i) tracking a progress associated with the at least one challenge and (ii) displaying a progress indicator for the at least one challenge taken by the user. The progress indicator may include (i) a progress level of the user associated with the at least one challenge, or (ii) a comparison of a performance between (i) the user and the one or more experts, (ii) the user and the one or more users, or (iii) combinations thereof.

Figure 13:
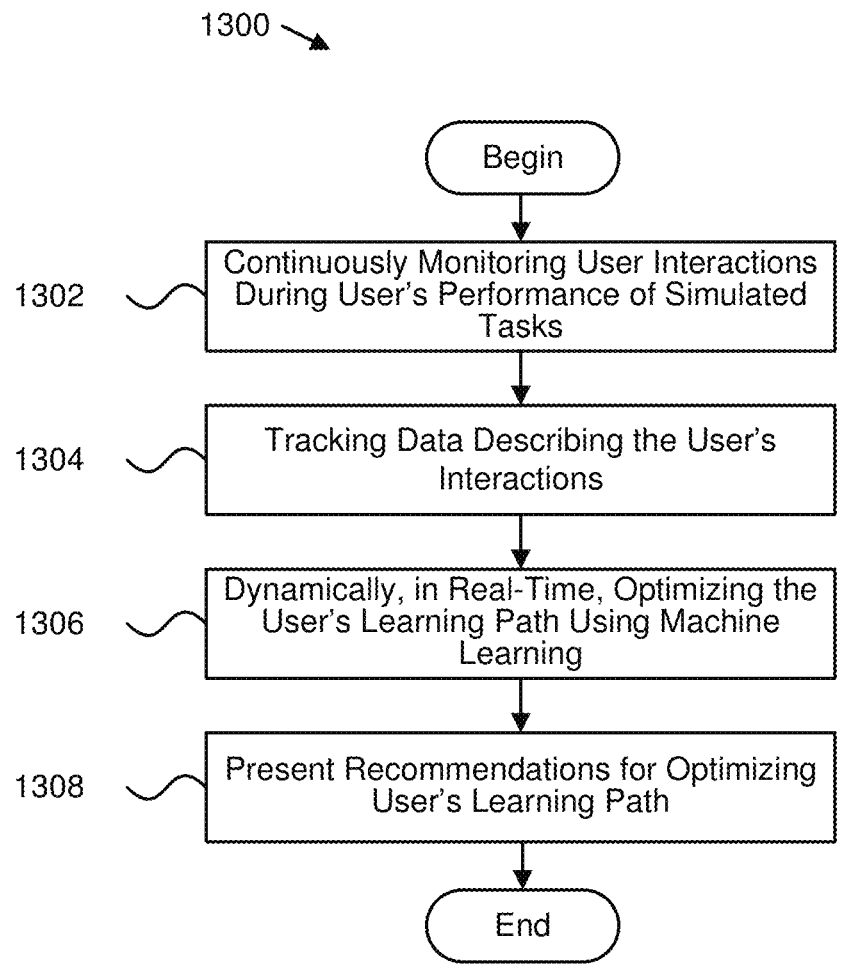
FIG. 13 is a flow diagram that illustrates a method for the simulation-based learning platform.

FIG. 13 depicts is a flow diagram illustrates a method for 1300 for adaptive learning. In one embodiment, the method 1300 begins and continuously monitors 1302 one or more interactions of a user 102 while the user 102 performs one or more simulated tasks digitally presented to the user 102. In further embodiments, the one or more simulated tasks are associated with a learning path. In one embodiment, the method 1300 includes tracking 1304 data describing the user's interactions during the user's performance of the one or more simulated tasks of the learning path.

In further embodiments, the method 1300 includes, dynamically and in real-time, optimizing 1306 the user's learning path by simulating multiple different learning paths using one or more machine learning processes and the tracked data. In one embodiment, the method 1300 includes presenting 1308 one or more recommendations to the user 102 for optimizing the user's learning path. In some embodiments, the one or more recommendations are generated as a function of the optimized learning path, and the method 1300 ends. In certain embodiments, the monitoring module 208, the metadata module 210, the machine learning module 212, and the recommendation module 214 perform the various steps the method 1300.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, cameras, microphones, sensors, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 14:
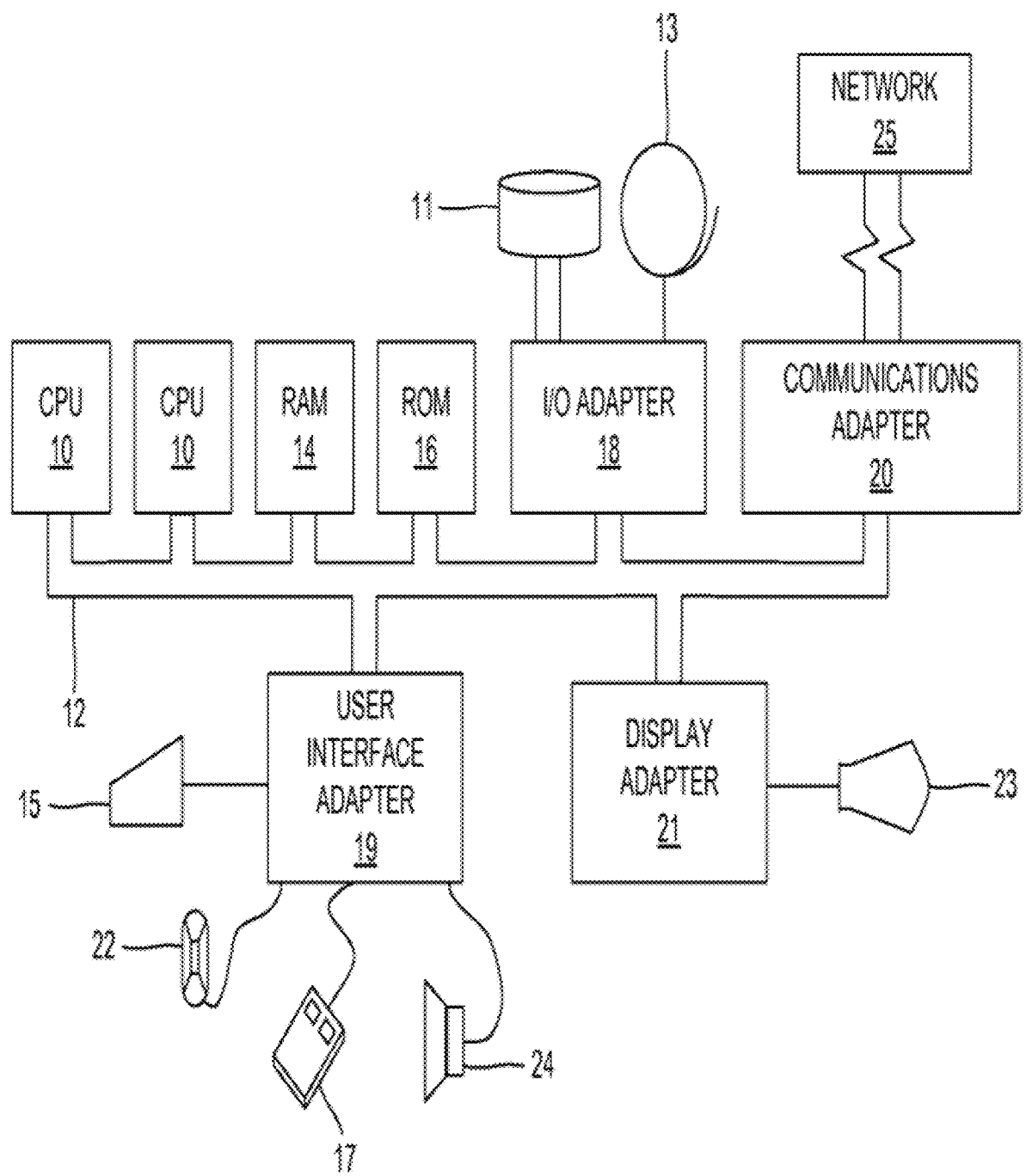
FIG. 14 a schematic diagram of computer architecture used in accordance with the embodiment herein.

A representative hardware environment for practicing the embodiments herein is depicted in FIG. 14. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device/camera/other sensors (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

FIG. 15 illustrates a user interface 1500 for selecting a course task to complete. In one embodiment, as explained above, a course may include modules, simulations, challenges, tasks, quizzes, tests, learning/study content (e.g., audio/video content, text content, illustrations, diagrams, and/or the like). The interface 1500 illustrates that a plurality of different modules 1502 are available for the user 102 to select from for different courses, e.g., a course entitled "LEARN HOW TO COMPUTE BASIC DESCRIPTIVE STATISTICS FOR NUMERIC VARIABLES". In one embodiment, the challenge information obtaining module 204 retrieves the available modules for the selected course and presents the modules to the user in the interface 1500.

In one embodiment, as the user 102 goes through the module and completes challenges/simulated tasks, the monitoring module 208 monitors the user's interactions, e.g., mouse movements, mouse clicks, or the like, and the metadata module 210 tracks data associated with the user's interactions. The user's interactions may comprise steps 1504 towards completing the challenge/simulated task, which are recorded and presented to the user on the interface 1500. In one embodiment, the interface 1500 allows the user 102 to undo and/or redo various steps 1504.

FIG. 16 illustrates a user interface 1600 for presenting course information for the user's selected course. The course information may include study material, explanatory material, and/or the like to help the user 102 learn the course material. The monitoring module 208, in certain embodiments, monitors the user's interactions with the course material such as how long the user 102 spends on certain videos, slides, and/or the like. The metadata module 210 tracks and stores this data, which may be fed to the machine learning module 212 for processing by the ANN 240 to optimize the user's learning path for challenges/simulated tasks associated with the selected course.

In some embodiments, the machine learning module 212 provides recommendations for customizing the flow of content presented to the user 102 that is most conducive to the user's learning pattern. For instance, the machine learning module 212 may determine, from data collected over time, that the user 102 is able to learn and retain concepts and skills in less time by watching explanatory videos instead of reading explanatory text. Therefore, the machine learning module 212 may recommend more videos for the user 102 to watch to learn the concepts being tested. Furthermore, the subsequent modules, content, challenges, and/or the like may not be unlocked or available until previous modules, content, challenges, and/or the like are completed and/or completed with a score that satisfies a threshold score. For example, a subsequent video may not be available for the user 102 to watch until the user watches all of a current video, at least a portion of a current video (e.g., five minutes of a seven minute video), completes a quiz associated with a video, and/or the like.

FIG. 17 illustrates a user interface 1700 for comparing a user's learning path with a reference learning path. As explained above, the user's learning path is continuously compared with a reference learning path, e.g., an expert learning path, to determine a score for the user's learning path based on the deviance of the user's learning path to the expert's learning path. An interface 1700 may be used to present the comparison of the reference learning path 1702 to the user's learning path 1704 and display, side-by-side, the steps that the user took to complete a challenge/simulated task and the steps included in the reference path so that the user can see the differences and make corrections accordingly.

The simulation-based learning platform 106, in one embodiment, provides a conceptual, immersive and interactive learning environment based on simulations and real business cases that the learner may experience in a real-life situation. The user 102 does not require prior knowledge on statistical code. The simulation-based learning platform 106 provides application of concepts on real-time data and on real-time challenges. The simulation-based learning platform 106, in certain embodiments, simulates a real business scenario and allows a user 102 to explore the data as he/she deems fit and appropriate. In an analytics framework, for example, the simulation-based learning platform 106 segments analytics/statistical learning and allows a user 102 to focus on the application of business, analytics, and statistical concepts separate from the mechanics of tools and programming.

The simulation-based learning platform 106, in one embodiment, facilitates learning by allowing the user 102 to focus on choosing a correct/optimal step/path/approach and an application/execution, which may interface with the chosen package (e.g., 'R', 'Python', 'SAS', 'Julia' among others for statistics/business analytics/optimization). In certain embodiments, there exists a combination of objectives and descriptive questions at critical points to test concepts. The instruction and hints, in further embodiments, facilitate the user 102 and his/her progress on completion of the challenges/simulated tasks. An intelligent scoring system, in some embodiments, helps in determination of the user's score and areas of improvement. Comparison of user steps and actions against an expert's recommended approach may help in identifying areas of deviation. A focus on approach as much as the output in a specialized field like analytics, for example, helps the user 102 toward a very high return on investment of time and effort.

The simulation-based learning platform 106, in various embodiments, enables collaboration, intelligent scoring, and learning by experience. The simulation-based learning platform 106, in certain embodiments, enables the user 102 to quickly move up the learning curve, and reduce time spent on training. The simulation-based learning platform 106, in some embodiments, provides extensive and broad exposure to many practical and relevant real-life experiences through use cases and simulated journeys to solve business challenges. The simulation-based learning platform 106, in one embodiment, enables the user 102 to define the problem thoroughly before arriving at a solution. The simulation-based learning platform 106, in various embodiments, quantifies the business impact of every step that the user 102 takes and helps to train the user 102 based on the business impact of the user's 102 decisions. The simulation-based learning platform 106, in some embodiments, includes adaptive machine learning processes for processing and analyzing behavioral data and progress of a platform user 102.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An apparatus comprising:
a processor; and
a memory that stores code executable by the processor to:
continuously monitor one or more interactions of a user with a computing device while the user performs one or more simulated tasks digitally presented to the user via the computing device, the one or more simulated tasks associated with a learning path;
track data describing the user's interactions during the user's performance of the one or more simulated tasks of the learning path;
dynamically and in real-time, optimize the user's learning path by simulating multiple different learning paths using one or more machine learning processes and the tracked data;
present one or more recommendations to the user for optimizing the user's learning path, the one or more recommendations generated as a function of the optimized learning path, the one or more recommendations comprising one or more hints that are presented to the user via the computing device at predetermined time intervals based on steps taken during the user's learning path; and
convert the user's interactions for performing the one or more simulated tasks into code for one or more programming languages.

2. The apparatus of claim 1, further comprising an artificial neural network configured to use the tracked data to determine an optimal learning path for the user.

3. The apparatus of claim 2, wherein the artificial neural network is trained using a plurality of historical data tracked for interactions from a plurality of different users that performed simulated tasks associated with their respective learning paths.

4. The apparatus of claim 2, wherein the code is executable by the processor to use output from the artificial neural network to generate the one or more recommendations.

5. The apparatus of claim 1, wherein the code is executable by the processor to compare the tracked data from the user's interactions with one or more reference learning paths for the one or more simulated tasks to determine one or more recommendations for optimizing the user's learning path.

6. The apparatus of claim 5, wherein the one or more reference learning paths include one or more of:
an expert learning path;
a learning path for a peer of the user; and
previous versions of the user's learning path.

7. The apparatus of claim 1, wherein the code is executable by the processor to incorporate user profile data to optimize the user's learning path, the user profile data comprising demographic data, experience data, academic data, and the user's learning schedule.

8. The apparatus of claim 1, wherein the one or more recommendations comprise one or more of suggestions, instructions, and advice for performing the one or more simulated tasks by one or more of using less time and using a lesser number of steps.

9. The apparatus of claim 1, wherein the one or more interactions comprises one or more of cursor movements, keyboard input, eye movements, and voice input.

10. The apparatus of claim 9, wherein the code is executable by the processor to create metadata for each of the one or more interactions, the metadata for each interaction comprising an identifier for the interaction, a type of the interaction, a timestamp for when the interaction occurred, a location for the interaction, and an amount of time that the interaction was performed.

11. The apparatus of claim 1, wherein the data describing the user's interactions includes one or more of:
interface elements that the user selects;
interface elements that the user clicks on;
areas of the display that the user looks at;
content that the user reads;
content that the user writes;
an amount of time that the user consumes a multimedia element;
website navigation; and
content consumption patterns.

12. The apparatus of claim 1, wherein the code is executable by the processor to:
assign the user scores during the user's performance of the one or more simulated tasks; and
compare, in real-time, the user's scores during the user's performance of the one or more simulated tasks with scores for other users who are performing the same simulated tasks.

13. The apparatus of claim 1, wherein the code is executable by the processor to facilitate communications between the user and one or more other users who are performing the same simulated tasks.

14. The apparatus of claim 1, wherein the one or more simulated tasks comprise one or more tasks associated with a data analysis project.

15. A system comprising:
a network;
a server configured to present a learning interface to a user;
a neural network communicatively coupled to the server over the network, wherein the server is configured to;
continuously monitor, at the server, one or more interactions of a user while the user performs one or more simulated tasks digitally presented to the user, the one or more simulated tasks associated with a learning path;
track data, at the server, describing the user's interactions during the user's performance of the one or more simulated tasks of the learning path;
dynamically and in real-time, use the neural network to optimize the user's learning path by simulating multiple different learning paths using one or more machine learning processes and the tracked data received from the server;
present, at the server, one or more recommendations to the user for optimizing the user's learning path, the one or more recommendations generated as a function of the optimized learning path, the one or more recommendations comprising one or more hints that are presented to the user via the computing device at predetermined time intervals based on steps taken during the user's learning path; and
convert the user's interactions for performing the one or more simulated tasks into code for one or more programming languages.

16. The system of claim 15, further comprising one or more data stores for storing the tracked data, the one or more data stores located remotely to the server and communicatively coupled to the server over the network.

17. The system of claim 16, wherein the server comprises one of a plurality of virtual servers executing on cloud devices, the plurality of virtual servers configured to execute different machine learning processes for optimizing the user's learning path, the one or more data stores mounted as local drives on the virtual servers.

18. A method comprising:
continuously monitoring, by a processor, one or more interactions of a user with a computing device while the user performs one or more simulated tasks digitally presented to the user via the computing device, the one or more simulated tasks associated with a learning path;
tracking, by the processor, data describing the user's interactions during the user's performance of the one or more simulated tasks of the learning path;
dynamically and in real-time, optimizing, by the processor, the user's learning path by simulating multiple different learning paths using one or more machine learning processes and the tracked data;
presenting, by the processor, one or more recommendations to the user for optimizing the user's learning path, the one or more recommendations generated as a function of the optimized learning path, the one or more recommendations comprising one or more hints that are presented to the user via the computing device at predetermined time intervals based on steps taken during the user's learning path; and
converting, by the processor, the user's interactions for performing the one or more simulated tasks into code for one or more programming languages.

19. A computer program product comprising a computer readable storage medium, that is not a transitory signal, having program code embodied therein, the program code readable/executable by a processor for:
continuously monitoring one or more interactions of a user with a computing device while the user performs one or more simulated tasks digitally presented to the user via the computing device, the one or more simulated tasks associated with a learning path;
tracking data describing the user's interactions during the user's performance of the one or more simulated tasks of the learning path;
dynamically and in real-time, optimizing the user's learning path by simulating multiple different learning paths using one or more machine learning processes and the tracked data;
presenting one or more recommendations to the user for optimizing the user's learning path, the one or more recommendations generated as a function of the optimized learning path and presented within an interface of a display of a computing device, the one or more recommendations comprising one or more hints that are presented to the user via the computing device at predetermined time intervals based on steps taken during the user's learning path; and
converting, by the processor, the user's interactions for performing the one or more simulated tasks into code for one or more programming languages.

* * * * *